Oct. 3, 1939.    F. M. CARROLL    2,174,686
ACCOUNTING MACHINE
Filed Aug. 23, 1935    19 Sheets-Sheet 1

INVENTOR
Fred M. Carroll
BY
W. M. Wilson
ATTORNEY

Oct. 3, 1939.   F. M. CARROLL   2,174,636
ACCOUNTING MACHINE
Filed Aug. 23, 1935   19 Sheets-Sheet 2
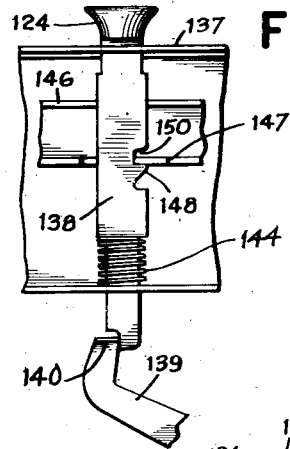
FIG.14.
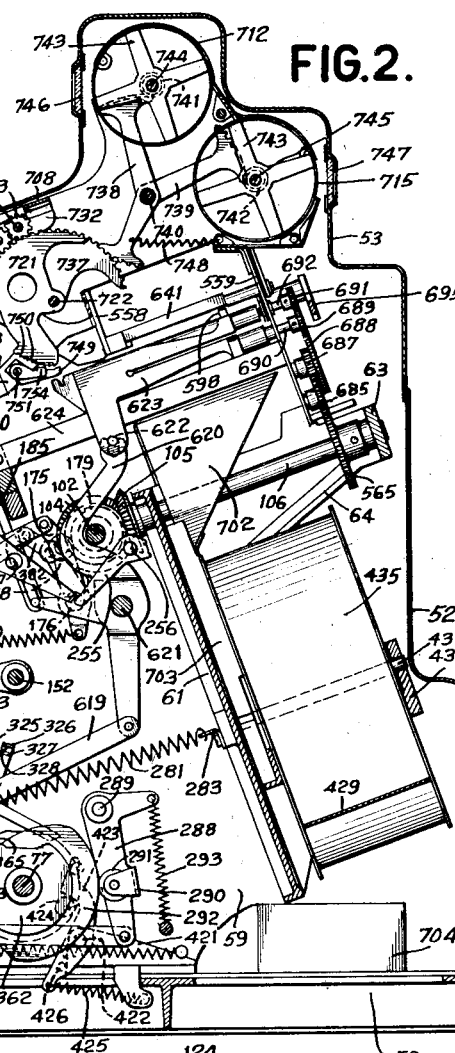
FIG.2.
FIG.15.
FIG.16.
INVENTOR.
Fred M. Carroll
BY
ATTORNEYS.

Oct. 3, 1939.　　　F. M. CARROLL　　　2,174,686
ACCOUNTING MACHINE
Filed Aug. 23, 1935　　　19 Sheets-Sheet 7

INVENTOR.
Fred M. Carroll
BY
W. M. Wilson
ATTORNEYS.

Oct. 3, 1939.　　　　F. M. CARROLL　　　　2,174,686
ACCOUNTING MACHINE
Filed Aug. 23, 1935　　　19 Sheets-Sheet 8
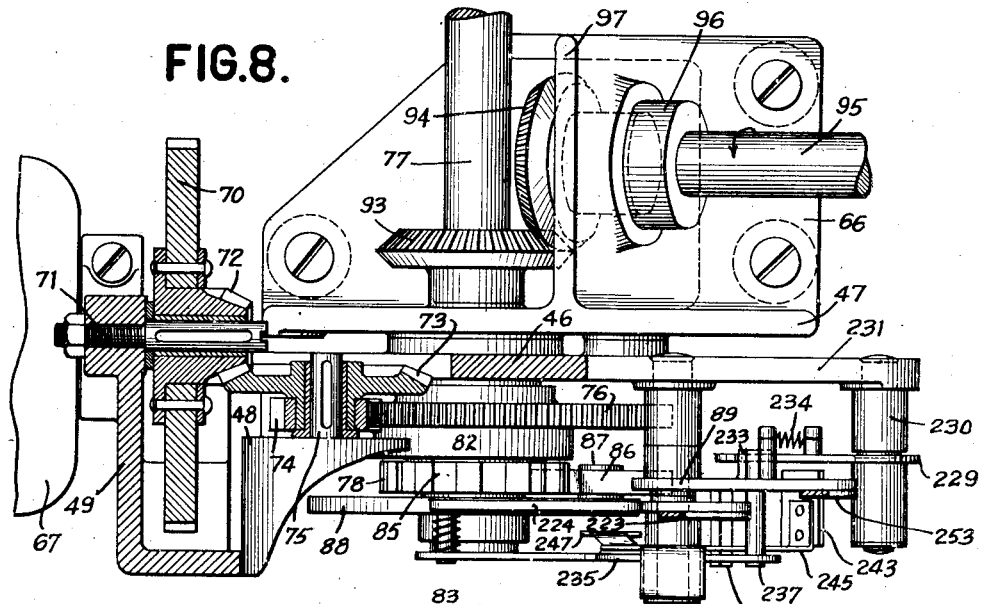
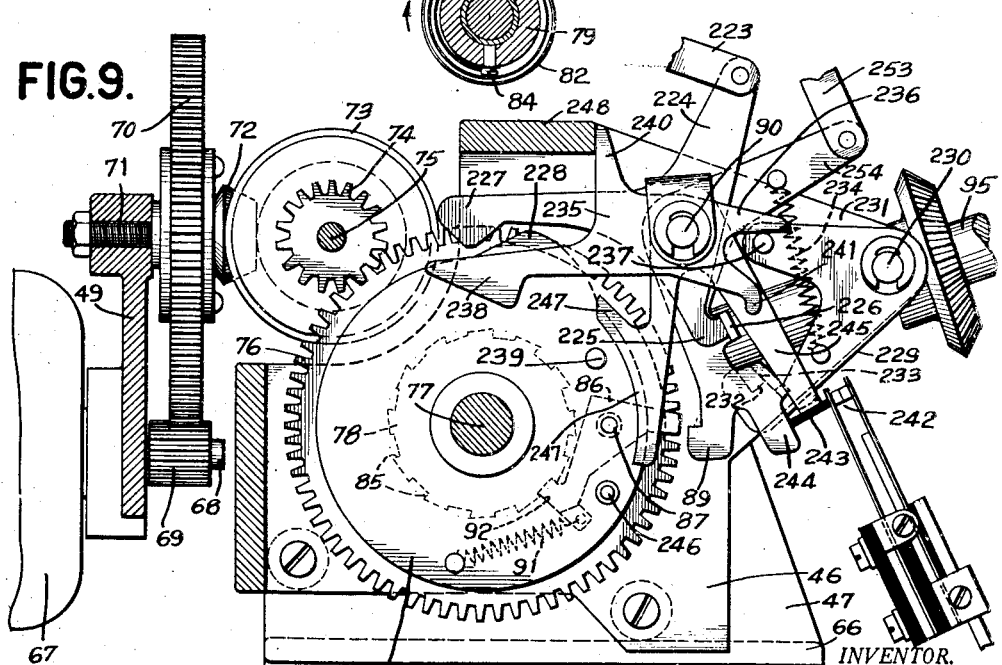
INVENTOR.
Fred M. Carroll
BY
ATTORNEYS.

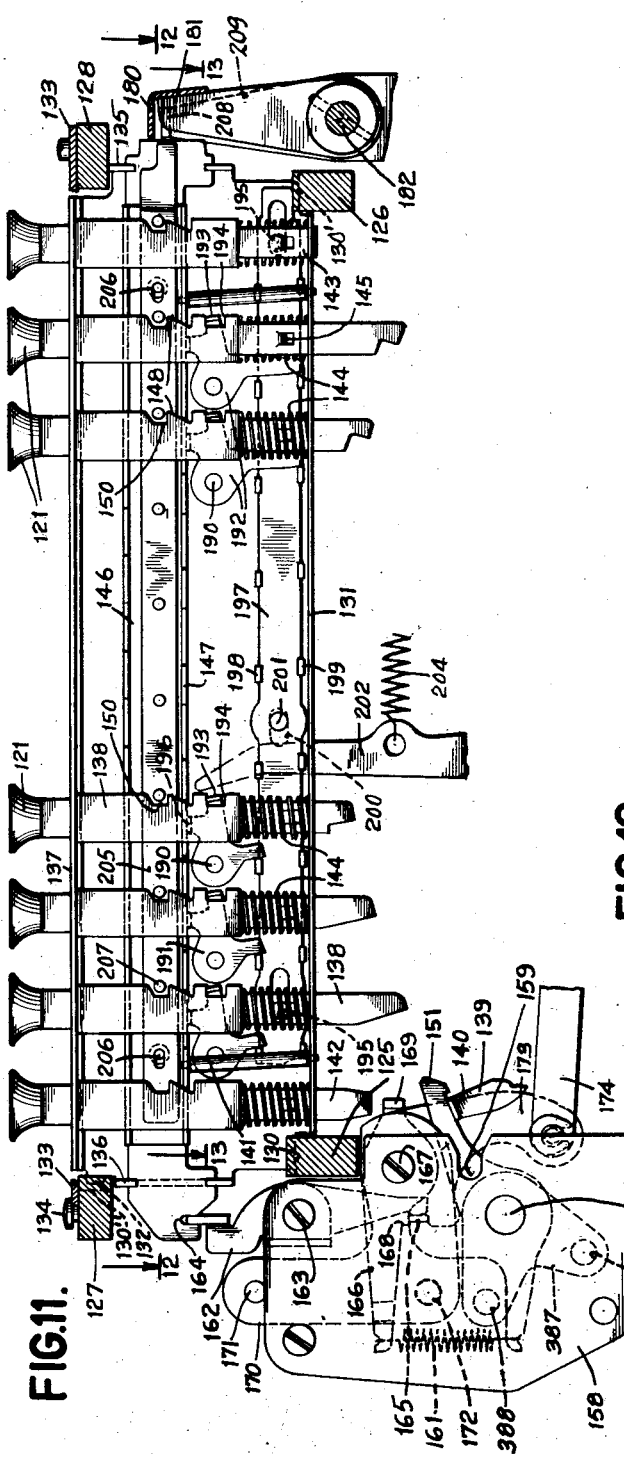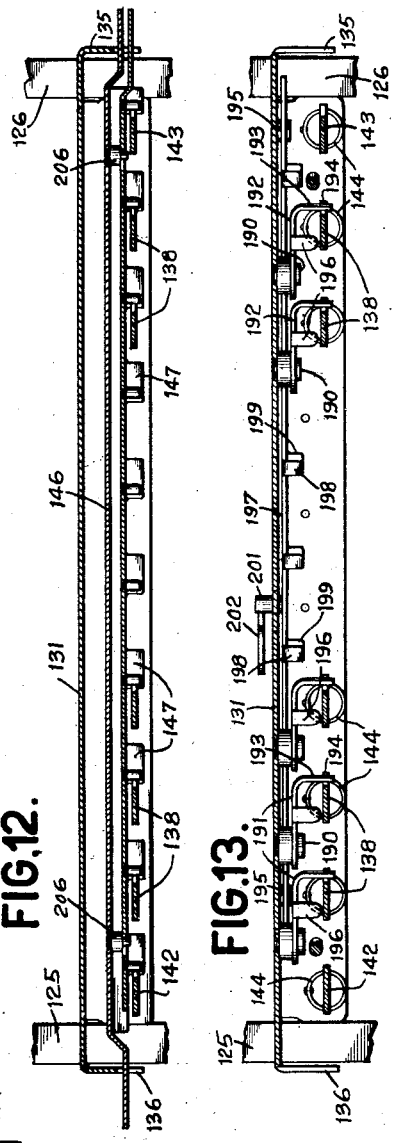

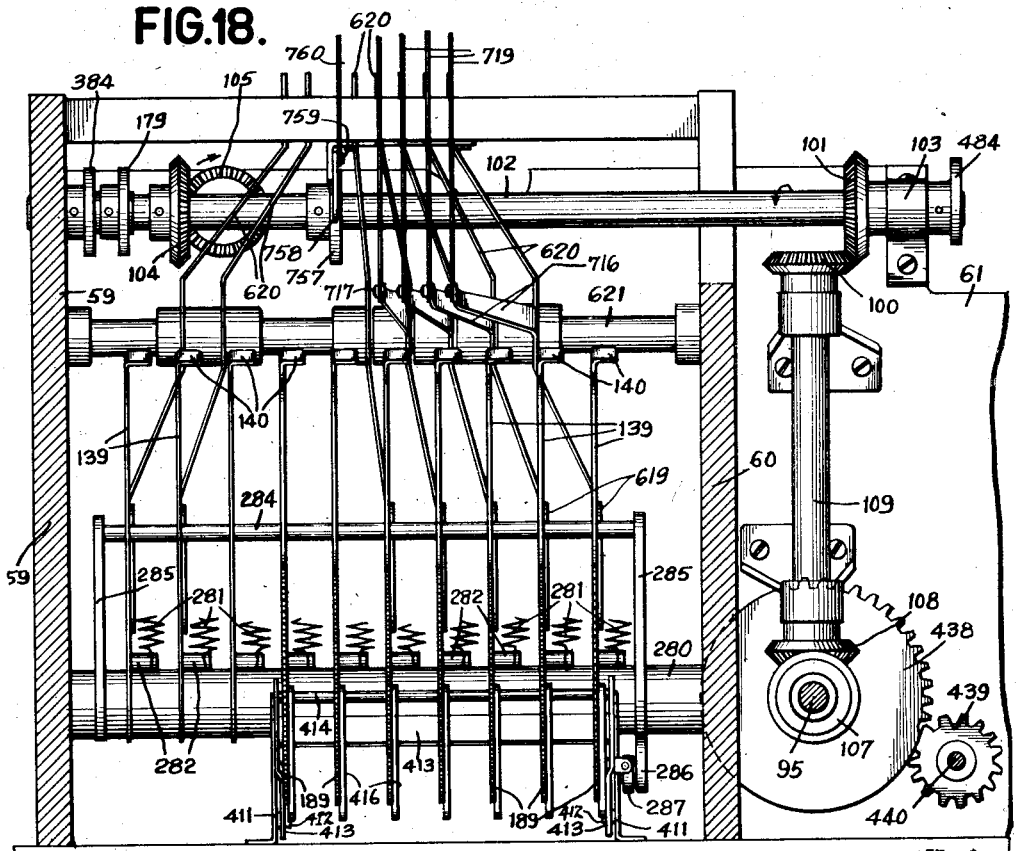
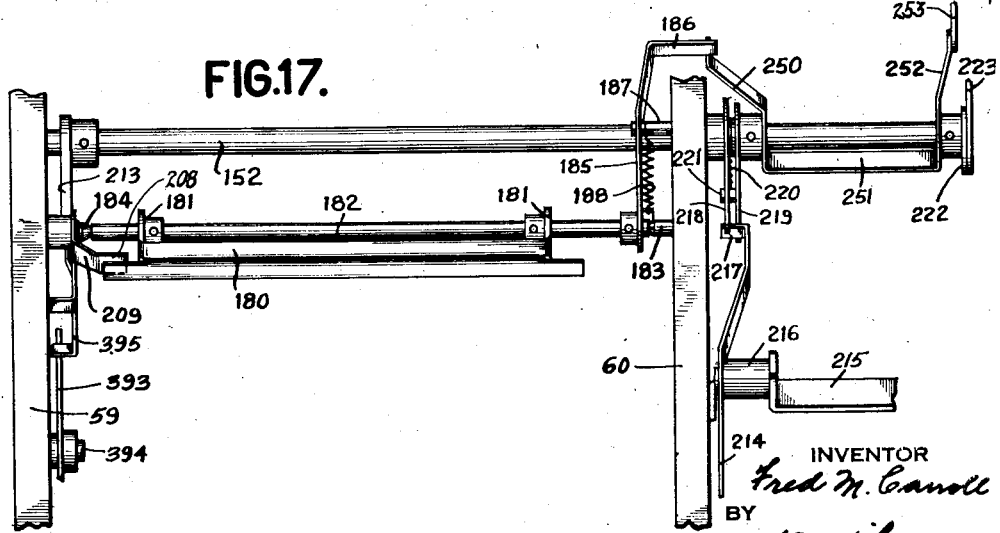

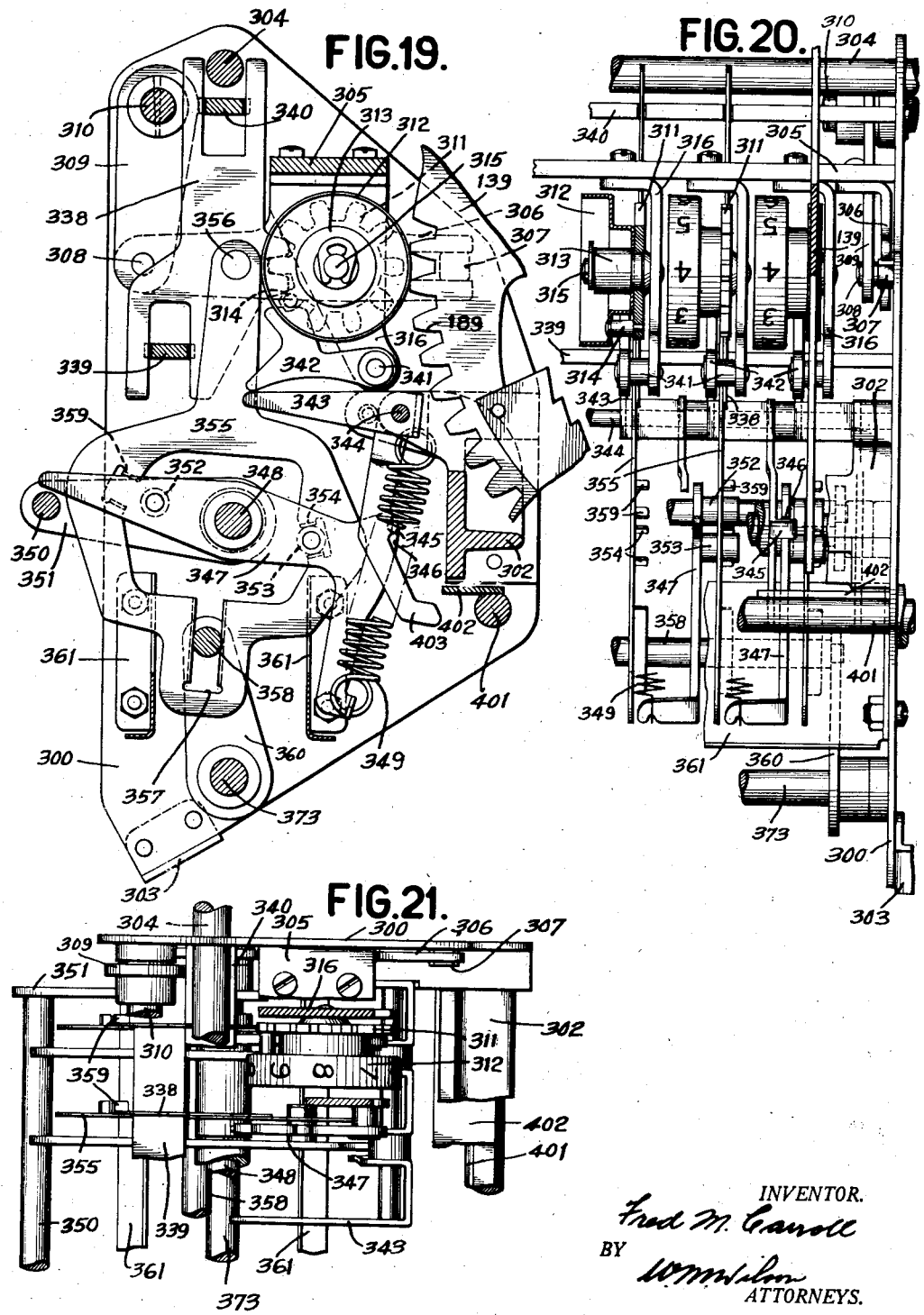

Oct. 3, 1939.  F. M. CARROLL  2,174,686
ACCOUNTING MACHINE
Filed Aug. 23, 1935  19 Sheets-Sheet 12
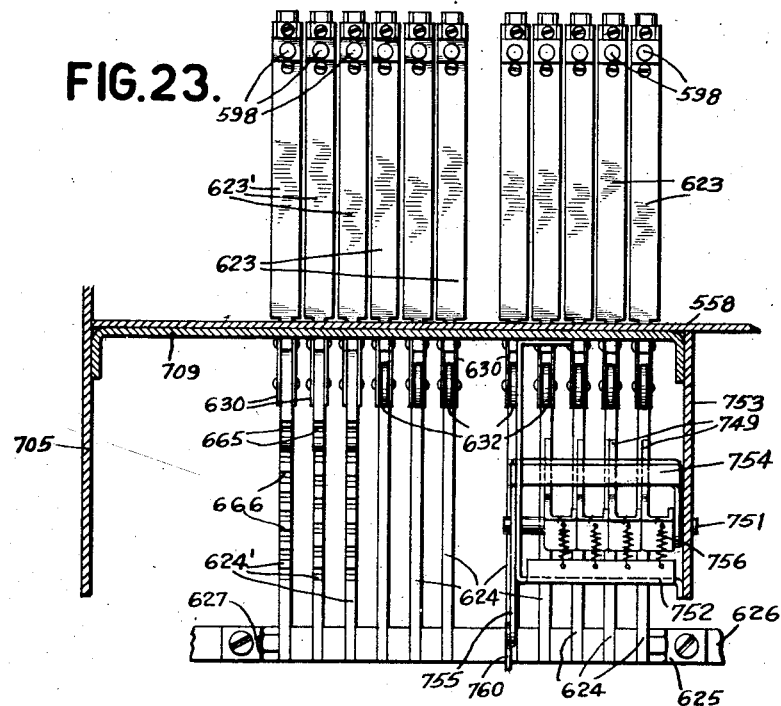
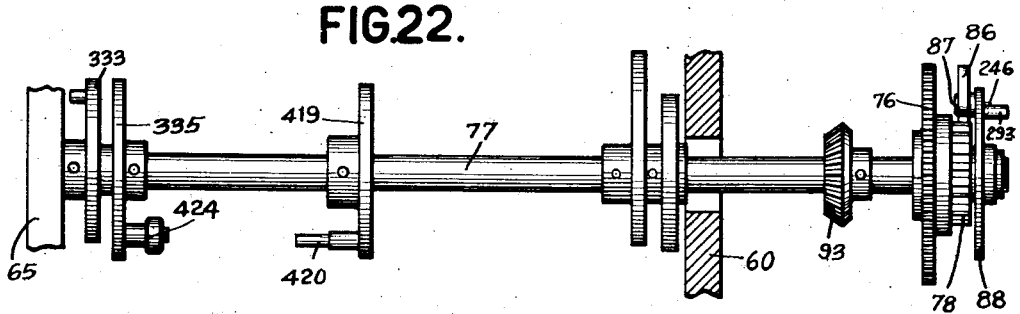

Oct. 3, 1939.   F. M. CARROLL   2,174,686
ACCOUNTING MACHINE
Filed Aug. 23, 1935   19 Sheets-Sheet 13

FIG.24.

DATE   5203   COSTOMER
Jan. 3, 1921   John Brown
THE INTERNATIONAL GROCERY
1 bu. patatoes   1 50
1 can Corn   16

Mer. Ret.
on a/c

TOTAL   1 66

FIG.25.   427 ones   Jan. 3, 1921   5203   John Brown 32
61   1 bu. patatoes   1 50
80   1 can Corn   16

Mer. Ret.
on a/c 73   1 66

428

FIG.26.   5203
Jan. 3, 1921   John Brown   429
○ ○   ○ ○
○
○   1 bu. patatoes   ○ 1 50
○   1 can Corn   16
○

Mer. Ret.
on a/c   ○ ○
○

1 66

INVENTOR
Fred M. Carroll
BY
ATTORNEY

Oct. 3, 1939.  F. M. CARROLL  2,174,686
ACCOUNTING MACHINE
Filed Aug. 23, 1935  19 Sheets—Sheet 14
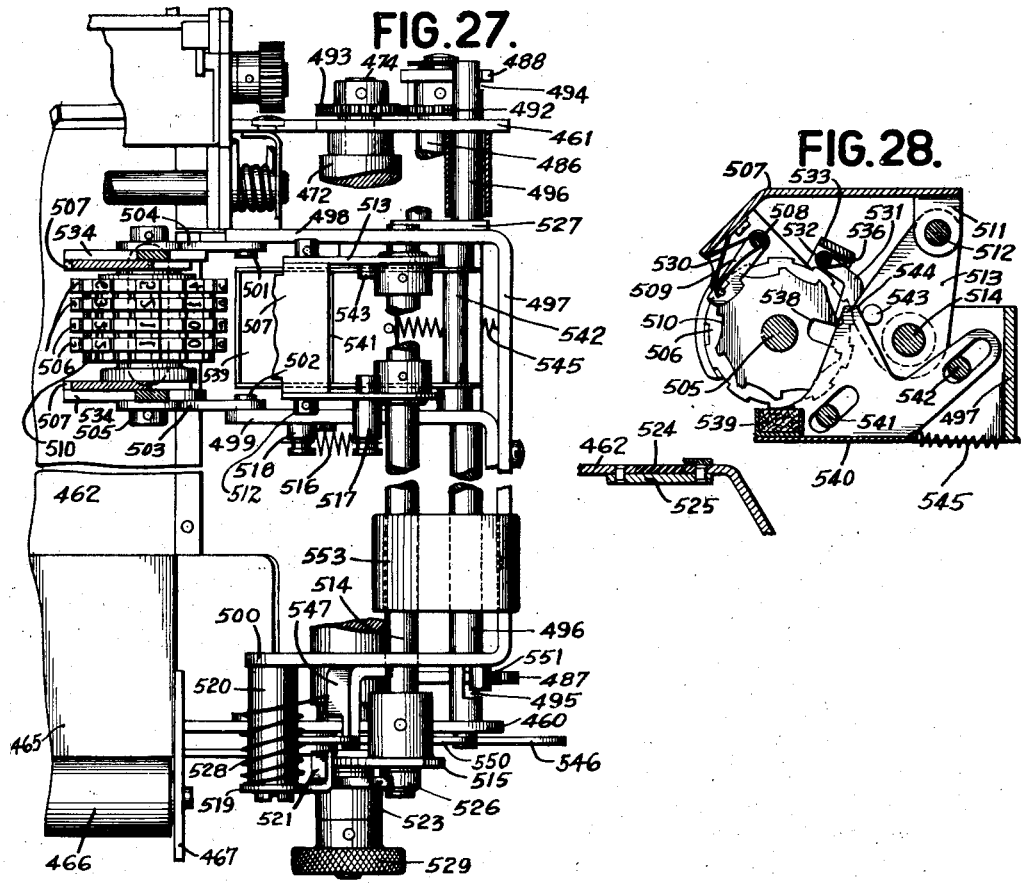
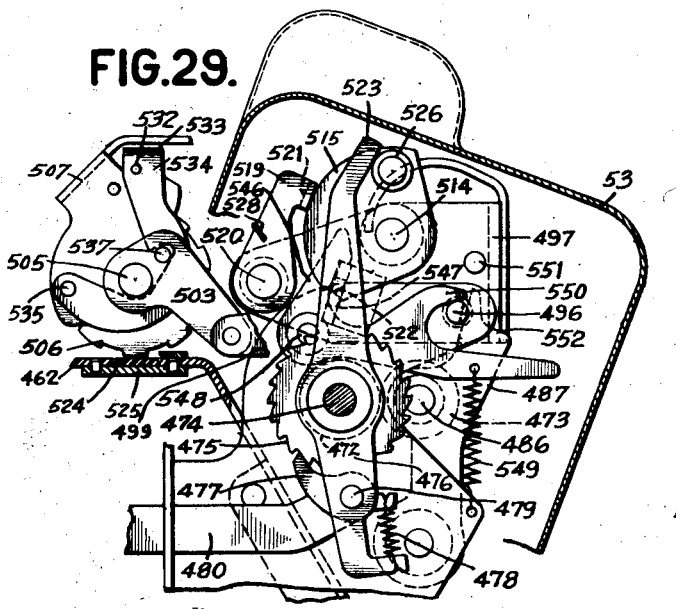

Oct. 3, 1939.　　　　F. M. CARROLL　　　　2,174,686
ACCOUNTING MACHINE
Filed Aug. 23, 1935　　　19 Sheets-Sheet 15
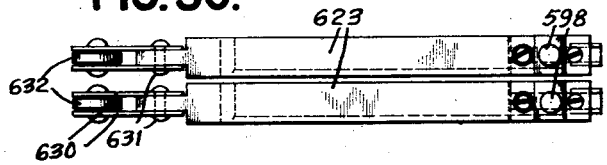
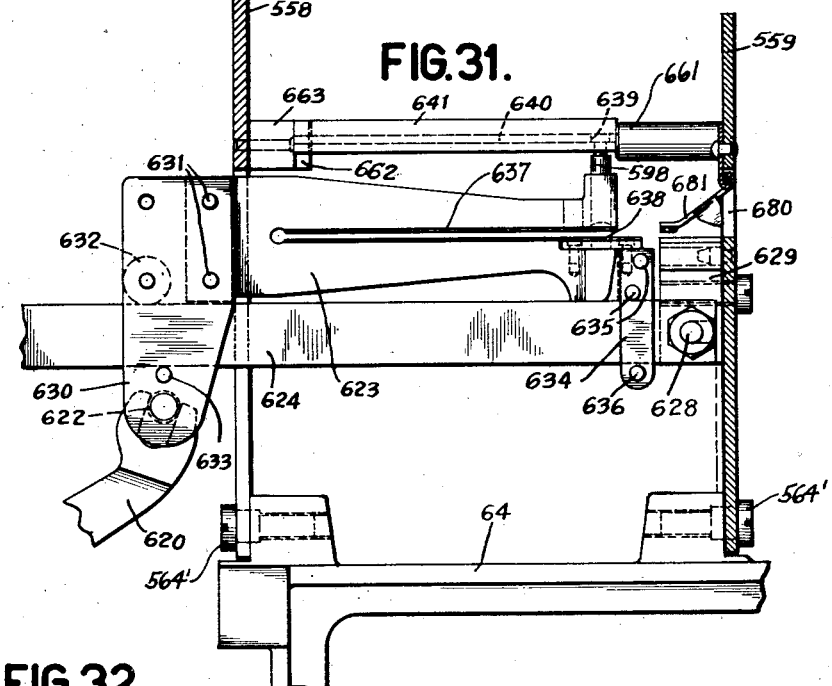
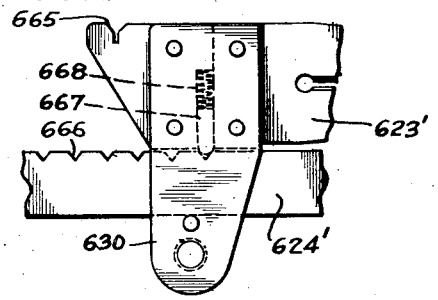

Oct. 3, 1939.   F. M. CARROLL   2,174,686
ACCOUNTING MACHINE
Filed Aug. 23, 1935   19 Sheets-Sheet 16

INVENTOR.
Fred M. Carroll
BY
W. M. Wilson
ATTORNEYS.

Oct. 3, 1939.  F. M. CARROLL  2,174,686
ACCOUNTING MACHINE
Filed Aug. 23, 1935  19 Sheets-Sheet 17

INVENTOR.
Fred M. Carroll
BY
ATTORNEYS.

Oct. 3, 1939.　　　F. M. CARROLL　　　2,174,686
ACCOUNTING MACHINE
Filed Aug. 23, 1935　　　19 Sheets-Sheet 18

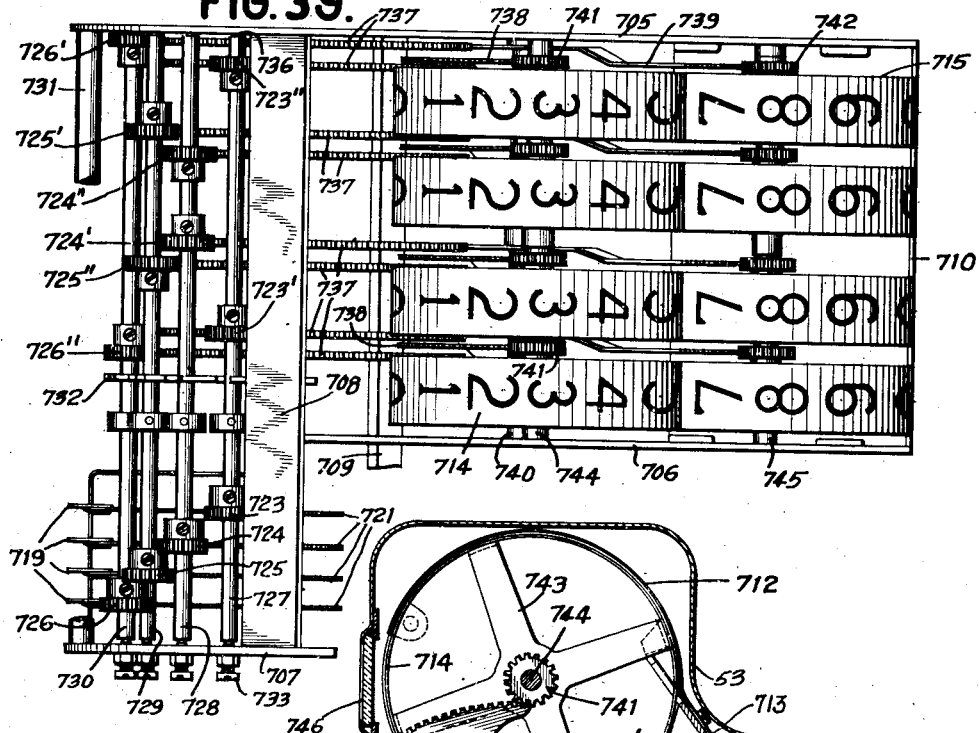
Oct. 3, 1939.  F. M. CARROLL  2,174,686
ACCOUNTING MACHINE
Filed Aug. 23, 1935  19 Sheets-Sheet 19

Patented Oct. 3, 1939

2,174,686

UNITED STATES PATENT OFFICE

2,174,686

ACCOUNTING MACHINE

Fred M. Carroll, Binghamton, N. Y., assignor to International Business Machines Corporation, New York, N. Y., a corporation of New York Application August 23, 1935, Serial No. 37,443

4 Claims. (Cl. 101—78)

This invention relates to devices for accumulating, indicating and recording retail sales transactions.

The main object of the present invention is to provide an improved and simplified sales recording machine. A feature of the invention is the construction of the machine in separate units which may be easily removed and assembled.

An object of the invention is to provide an autograph recording device in which written information is impressed in triplicate on a record strip and a perforated card for the proprietor of the machine in addition to the receipt given to the customer.

Another object of the invention is to provide a retail sales recorder or cash register for producing a perforated record which carries written information in addition to the perforations therein representing the date, transaction, department, clerk, and amount of a sale.

Another object of the invention is to provide a serial numbering device which cooperates with the series of records at an autograph opening without interfering with the free motion of the hand when writing at the opening. The serial number is impressed in triplicate on the receipt, record strip, and perforated card to identify the recorded information common to each transaction.

Another object of the invention is to provide an improved form of interlock between the keyboard and driving means to prevent operation of the machine unless a transaction key is depressed. A machine operating key must also be depressed before the machine operation is initiated. The machine is locked if a key is only partly depressed.

The interlock works in a reverse manner to lock the keys while the machine operates. Other connections to the interlocks are adapted to lock the machine when the record strip storage roll is full and when the card stock is exhausted.

Another object of the invention is to provide an indicating mechanism with indicator drums which move towards a home position simultaneous with the movement of the indicator operating means towards a new setting. The indicating devices are provided with individual adjustments for setting the indicator drums in each denominational order.

A further object of this invention is to provide an improved form of adding and subtracting accumulator. The accumulator includes a transfer mechanism which serves to turn the accumulator wheels in either of two directions to enter and deduct additive and subtractive carry units. Each accumulator wheel is mounted on a separate removable frame.

Another object of the invention is to provide an improved form of card shearing, punching, and ejecting device. Each punch and associated die are mounted on a common settable frame with connections to the keyboard for adjustment.

Another object of the invention is to provide a keyboard which is flexible inasmuch as the keys thereon are adapted to be rearranged for various kinds of sales work. In the present disclosure one group of transaction keys controls subtraction operation, while another group of transaction keys in the same bank controls adding operation, and a third set of keys in the bank controls non-adding.

The arrangement of the keys in the transaction bank is optional, because the accumulator control exercised by this bank is so devised that a key in any position in the bank may select non-adding, adding or subtraction operation of the accumulator.

Another feature of the invention is an improved form of paper feeding device. The record materials are fed by a pair of rollers one of which is movable out of engagement with the other. Leaf springs connected to arms carrying the movable roller, not only serve to press the roller in feeding position, but also act as links for raising the roller frame.

The construction of the illustrative machine is shown in a set of drawings which accompany and form part of the specification.

In the drawings:

Figure 2 is a sectional elevation view taken through the center of the machine.

Figure 8 is a plan view, partly in section, of the clutch mechanism.

Figure 9 is an elevation view, partly in section of the clutch mechanism.

Figure 10 is a detail view of the spring cushioning device between the clutch disc and the main operating shaft.

Figure 11 is an elevation view of the special bank of transaction keys.

Figure 12 is a middle sectional plan view of the special keys.

Figure 13 is a lower sectional plan view of the special key bank.

Figure 14 is a view showing an ordinary amount key in a depressed position.

Figure 15 is an elevation view showing the special key bank in section.

Figure 16 is another sectional elevation view of a pair of amount keys.

Figure 17 is a plan view of the interlocking mechanism between the keyboard and the clutch devices.

Figure 18 is a front elevation view of the actuators and the offset converging levers attached thereto.

Figure 19 is a sectional view of the adding and subtracting mechanism.

Figure 20 is a front view, partly in section, of the adding and subtracting mechanism.

Figure 21 is a top view, partly in section, showing an accumulator wheel and transfer mechanism.

Figure 22 is a plan view of the main drive shaft.

Figure 23 is a plan view of the punch guides and indicator retaining pawls.

Figure 24 shows a sample receipt such as that issued by the machine.

Figure 25 shows a portion of the continuous record strip stored in the machine.

Figure 26 shows an example of the perforated record card produced by the machine.

Figure 27 is a plan view, partly in section, of the serial numbering device.

Figure 28 is a sectional elevation view of the serial numbering device.

Figure 29 is a side view showing the operating mechanism associated with the serial numbering device.

Figure 30 shows a pair of punch carrying slide members.

Figure 31 is an elevation view of a punch slide member.

Figure 32 is a detail view of the adjusting and locating device associated with the date punch slide members.

Figure 39 is a plan view of the indicator drums and the gear train for adjusting these indicators.

Figure 40 is a sectional elevation view of the indicating devices.

THE ILLUSTRATIVE MACHINE

Figure 1:
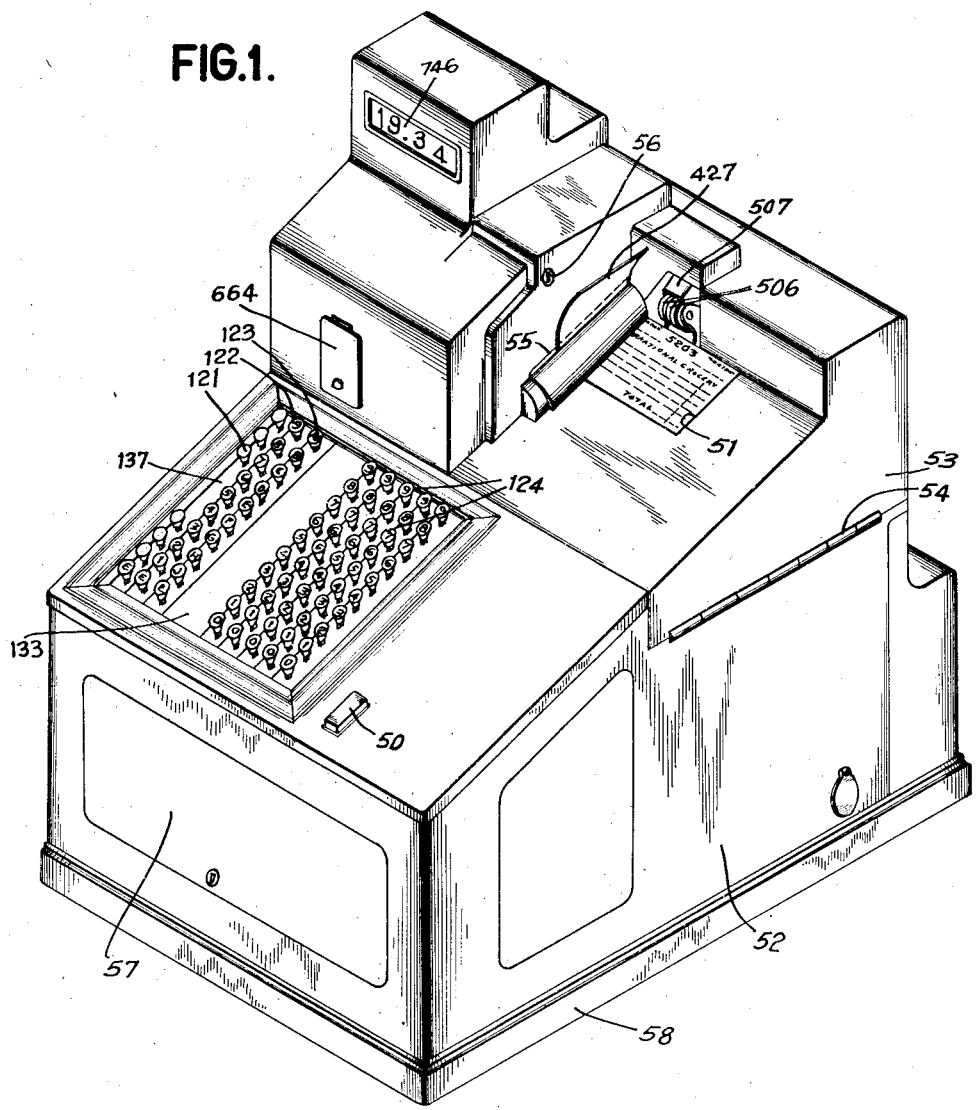
Figure 1 is a perspective view of the machine.

Referring to Figure 1, it is noted that the machine is provided with a keyboard including a bank of transaction keys, department keys, and clerk keys in addition to five banks of amount keys. These keys are operated at the time a sale is made in a retail store. The amount set up on the four lower order of banks of keys is indicated on two sides at the top of the machine. Before an operating key 50 is depressed, the clerk makes a record of the sale by writing on the record material appearing in the autograph opening 51 cut in the slanted writing table formed on the casing 52 of the machine. The portion 53 of the case is hinged at 54 to swing open at the autograph section of the case and give access to the record material, carbon rolls and serial numbering device. After operation of the machine to record a transaction, one portion of the record materal 427, Fig. 24, projects through the slot 55 in the case. This record is a receipt which may be torn off and given to the customer.

A lock 56 is provided on another portion of the case which is held closed to cover a continuous record roll containing duplicate impressions of all receipts for the information of the proprietor of the machine.

At the front of the machine is another locked cover 57 which the proprietor may open to observe and reset an accumulating mechanism.

*Framework*

The framework of the machine comprises a base 58 (Figs. 1, 5, and 7), two main side frames 59 and 60, and a rear frame 61 attached to the side frames. Attached to the rear frame 61 are a pair of brackets 62 (Fig. 3) and 64 (Fig. 4) acting as a support for the record feeding and punching mechanism. Across the rear end of these brackets is fixed a rectangular bar 63 tieing the brackets together and acting as an intermediate support.

Attached to the base 58 are a pair of supports for the main drive shaft. They take the form of a bracket casting 65 (Fig. 6) supporting the left end of the main shaft, and a bearing block frame 66 (Fig. 8) at the other end.

The main side frames are tied together at various points by shafts and bars which act as supports for mechanisms described hereinafter.

*The driving mechanism*

Attached to the base 58 (Fig. 3) is a motor 67, the shaft 68 (Fig. 9) of which carries a pinion 69 in mesh with a gear 70. The gear 70 turns loosely about a pivot 71 fixed on the side of an upright web 49 on a casting 46 attached to bearing block frame 66. Attached to the side of gear 70 is a bevel pinion 72 engaging with a bevel gear 73 attached to a plain pinion 74, both being pivoted on a stud 75 fixed on a web 48 of casting 46 at right angles to pivot 71. In mesh with pinion 74 is a gear 76 loosely mounted on the main drive shaft 77. The main shaft bearing is in the vertical web 47 of frame 66.

Adjacent to the gear 76 is a clutch disc 78 also loosely mounted on the main shaft. The disc is formed with a notched collar 79 (Fig. 10) cooperating with a stud 80 mounted on the side of gear 76. The stud 80 and a notch 81 in collar 79 are proportioned to permit the gear to move a short distance before the clutch disc is positively engaged. A clock spring 82 is connected between the gear and the disc to act as a cushioning device to prevent the sudden impact that would otherwise occur when connection is made between clutch disc and the main shaft. The spring 82 is fixed at one end on a stud 83 protruding from the side of gear 76 and at the other end it is secured to a stud 84 extending from the collar 79. When running idly, the drive between gear 76 and disc 78 is through spring 82. As soon as the clutch is operated, the spring is stressed before the pin 80 makes positive contact with the wall of notch 81 in collar 79 on disc 78.

The clutch disc 78 is formed with a series of notches 85 in the same plane with a clutch dog 86 pivoted at 87 on the side of a plate 88 fixed to the main shaft 77. This dog 86 is normally held out of engagement with the clutch disc 78 by means of a latch 89 pivoted on stud 90 on casting 46. When released by operation of latch 89, the dog 86 is rocked in a clockwise direction by a spring 91 attached to a stud on side of plate 88. Then the extension 92 on dog 86 falls into one of the notches 85 and couples the main shaft 77 to the motor through the gearing outlined hereinbefore. After one revolution the shaft is stopped when latch 89 again engages dog 86. Another flexible detenting device described hereinafter holds the main shaft in normal position.

Figure 3:
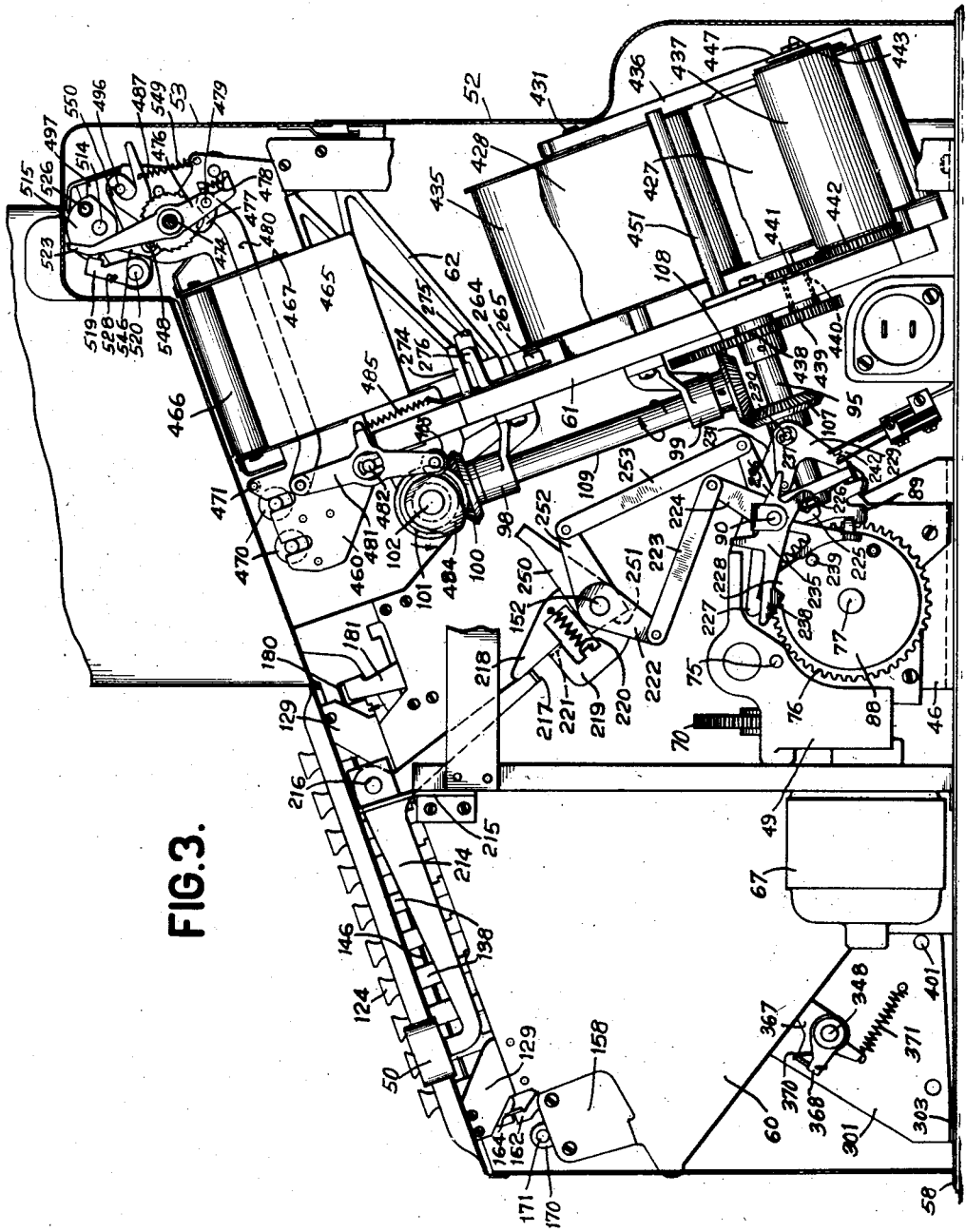
Figure 3 is an elevation view of the right-hand portion of the machine with the case removed.
Figure 6:
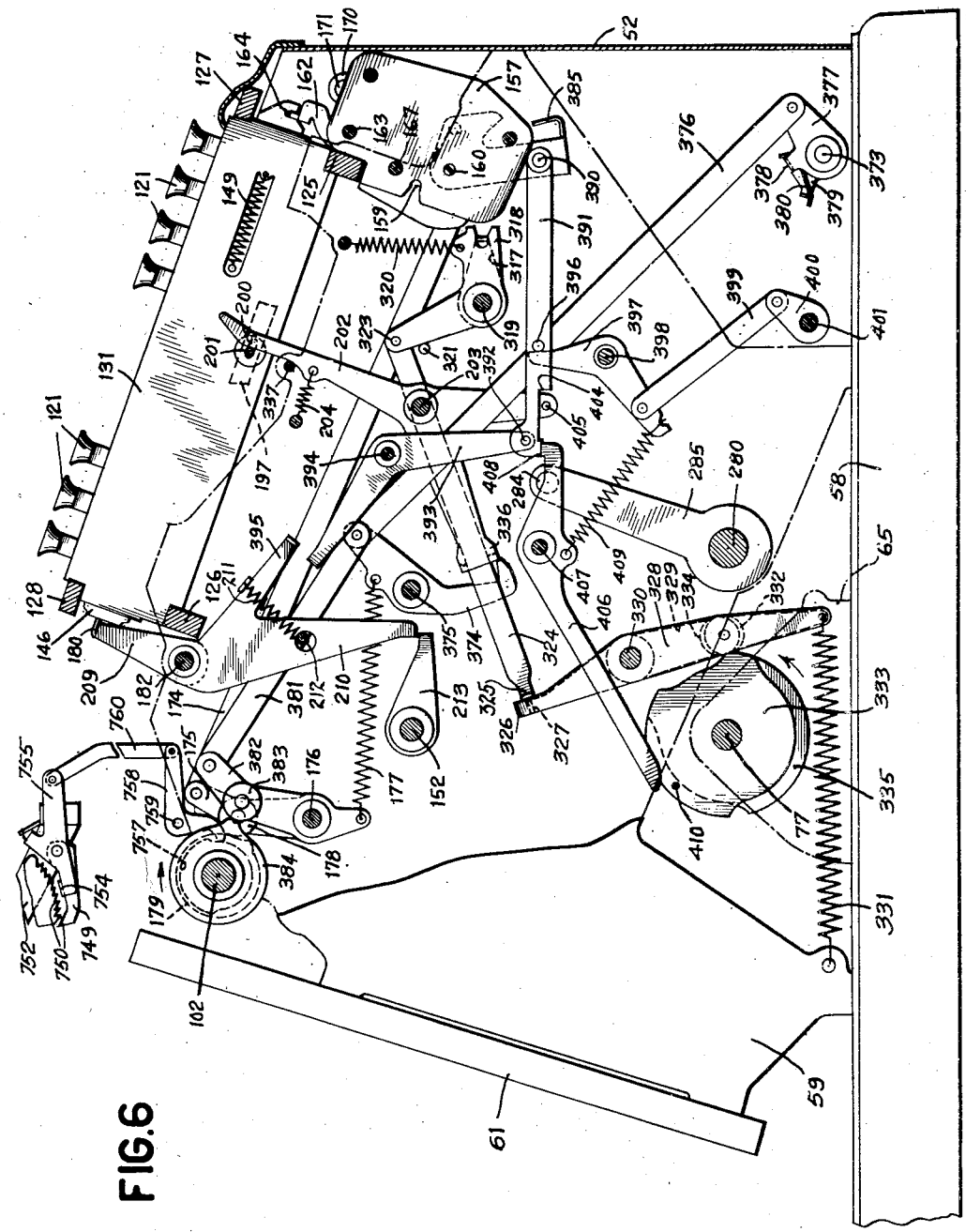
Figure 6 is an elevation view of the left side of the machine.

The main shaft 77 extends across the entire machine (Fig. 22) and is supported at the right end in a bushing mounted in web 47 of frame 66 and at the other end it is carried on casting 65 (Figs. 6 and 22). Near the right end of the shaft there is fixed a bevel gear 93 which engages with another bevel gear 94 (Fig. 8) fixed at the lower end of a slanted drive shaft 95. The lower end of shaft 95 is guided by bushing 96 mounted in the web 97 on casting frame 66. Referring to Fig. 3 it is seen that shaft 95 is positioned at right angles to rear frame 61 in which it finds a bearing at the rear end. Attached to shaft 95 is another bevel gear 107 in mesh with a gear 108 on a connecting drive shaft 109. This shaft 109 assumes a position parallel to the slanted rear frame 61 and is supported near the ends by bearings 98 and 99 projecting from the inside of frame 61. At the upper end of shaft 109 there is attached another bevel gear 100 in mesh with a bevel gear 101 secured to a horizontal drive shaft 102.

A clear showing of shaft 102 is disclosed in Fig. 18, where it is seen that the shaft is supported at the left end in side frame 59, while at the right end it is carried by bearing 103 projecting from the rear frame 61. Near the left end of shaft 102 is fixed another bevel gear 104 in mesh with a bevel gear 105 fixed on the end of a punch operating shaft 106. The punch operating shaft 106 (Fig. 2) is mounted on bearings located in the rear frame 61 and the rectangular bar 63.

*The keyboard*

The keyboard is composed of four different classes of keys. Naming them in order as they appear from left to right in Fig. 1, there are the transaction keys 121, department keys 122, clerks' keys 123, and five banks of amount keys 124. There are ten keys in each of the eight banks of keys. The front key in each of the special banks is an error key, and keys in same position in the amount banks are zero control keys. The basic construction of all key banks is similar, so that a description of one applies to all others.

The keyboard frames are supported and held fixed by four rectangular bars 125, 126, 127 and 128, Figs. 2 and 11. The two lower bars 125 and 126 are secured directly to the main side frames 59 and 60, Fig. 5, and the other upper bars 127 and 128 are held in place with four brackets 129 extending in from the side frames. A series of notches 130, 130' and 130'' are cut in alignment at regular distances along the bars 125, 126 and 127. In Fig. 11 it is noted that notches 130, 131' 127. In Fig. 11 it is noted that notches 130, 131' in the upper sides of bars 125 and 126, and a notch 130'' at the rear of bar 127, act to locate and fix in position a channel frame 131, Fig. 15, holding a bank of keys. Each bank of keys is mounted in this fashion in a separate removable channel. At the front, each channel 131 is formed with an extension 132, Fig. 11, fitting into one of the notches 130'' in bar 127. The rear bar 128 is made readily removable by pivoting it on two screws in the rear brackets 129. It is locked in position by a plate 133 which is mounted thereon and inserted under the head of a stud 134 on bar 127. This plate 133, Fig. 1, also covers the space between the clerk and amount keys.

When the bar 128 is in position, Fig. 11, it overlies a tab 135 formed as part of the channel 131. A similar tab 136 is swung under the bar 127 when assembling a key bank. Therefore, by simply removing the bar 128, all of the channels 131 are made accessible for removal, and a combined lifting and sliding motion at the rear of a selected channel, serves to loosen a bank of keys for extraction from the machine.

At the top of each channel 131, Figs. 11 and 16, is attached a plate 137 with slots for guiding the upper ends of key stems 138 attached to the tops of the keys. At the lower ends the key stems are guided by slots in the bottom of channel 131. In Figure 11 is noted that the stems 138 are of various lengths. The ends of the stems coincide with the arc described by ends of a series of actuators 139. When the keys are in the normal position, the lower ends are above and out of the path of an overturned lug 140 formed on the end of an actuator 139. However, when any key is depressed by pushing on the related button top 121, 122, etc., the end of the key is placed in the path of the actuator to stop it after a differential extent of movement. The zero or error key stems 142 at the front of the keyboard and the "9" key stems 143 at the rear of the key banks are of a formation avoiding contact with the actuator 139. It is possible to form them this way, because of the nature of control of the actuator setting, as described more fully hereinafter.

A spring 144 coiled around the lower end of each key stem between a shoulder thereon and the upper side of the bottom flange of channel 131, tends to hold the key in a raised position with an upper shoulder thereon contacting the underside of plate 137. Overturned lug 145 is formed near the bottom of each key stem to act as a stop when the key is depressed.

A means is provided to lock any key in depressed position and release the key when another key is depressed in the same bank. For this purpose there is provided a horizontal slide 146 (Figs. 11, 14, 15, and 16) in each bank. The sectional view in Fig. 16 shows that the slide 146 is shaped in the form of a channel with an upper flange out of alignment with the key stems, but a lower flange is formed with projections 147 cooperating with cam faces 148 (Fig. 14) formed on the sides of the key stems 138. A spring 149 (Fig. 6) drawn between the slide 146 and channel 131, tends to hold the slide to the left (Fig. 11) against the sides of the keys. Each slide is assembled on a key bank channel 131 and guided thereon by notches formed in the extensions 135 and 136 formed at the ends of the channel 131. Although the locking slide is guided by the slots in the main channel, it does not bear against the bottom of the notches. Such frictional contact is avoided by the support furnished through the use of a pair of supporting trunnions 141 propped up between holes in the lower flange of channel 131 and holes in the lower flange of lock slide 146. The trunnions are chamfered to permit a free rocking motion as the slide moves back and forth.

When a key is fully depressed, the co-operating extension 147 passes over the high point of the cam face 148 and falls into a notch 150 formed in the side of the key stem; then the key is locked in its depressed position, as shown in Fig. 14. Subsequent depression, of any other key in the same bank, moves the locking slide 146 to the right (Fig. 11), so that the previously depressed key is free to rise into the normal position.

The motion of locking slides 146 is effective to release the actuators 139 which are normally held in zero position by latches 151. The "9" keys and "Cash on a/c" key 143 are effective to release the related actuator 139 through the operation of slides 146 and latches 151. Therefore these keys need not be provided with an actuator stopping face, because when the actuator is free, it moves through 9 steps of motion before abutting against shaft 152 (Fig. 2).

The zero latch devices

Figure 5:
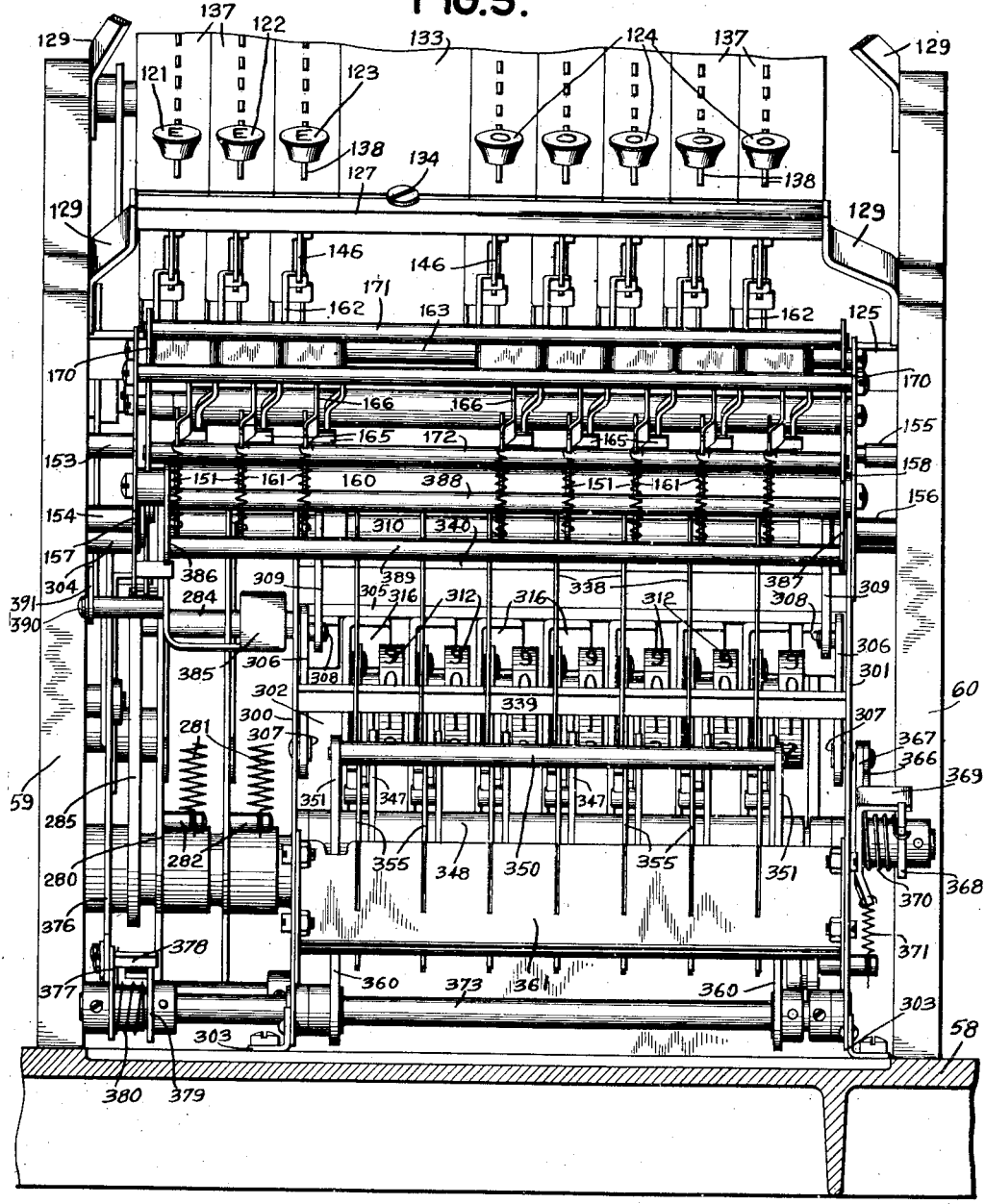
Figure 5 is a front elevation view of the machine.

The machine is provided with a separate removable unit containing the latches for holding and releasing the actuators. Referring to Fig. 5 it is seen that a pair of studs 153 and 154 project on the inside of the main frame 59 and a somewhat similar pair of studs 155 and 156 project on the inside of the right frame 60. These studs form a support for the side frames 157 and 158 of the zero latch mechanism. The stud 156 is removable so that the unit may be shifted to the right away from the shoulders on studs 153, 154, and drawn forward out of the machine. This is possible because the openings 159 (Fig. 11) in the frames 157 and 158 co-operating with the studs 153 and 155, are open towards the rear. A rod 160, mounted between the frames 157 and 158, forms a fulcrum for the series of zero latches 151 co-operating with the lugs 149 extending from the actuators 139.

There is one such latch for each actuator in the machine. A spring 161 attached to a horizontal arm of the latch, tends to hold the locking face thereon in position for engagement with the actuator. A lever 162 formed as a bail pivoted on a rod 163 in frames 157 and 158, provides an operating connection between a latch 151 and the related key locking slide 146. The upper end of lever 162 is formed with a vertical tab fitting into a notch 164 formed in the lower edge of slide 146. When the slide is operated the lever 162 is rocked in a clockwise direction (Fig. 11) and then back to normal position. When it is so operated, the lower end of lever 162 co-operates with an overturned tab 165 formed on a vertical arm of latch 151. Through these connections the latch 151 is rocked in a counterclockwise direction. A detent 166 pivoted on a rod 167 is adapted to hold latch 151 in an operated position out of the path of actuator 139. A shoulder 168 formed on detent 166 co-operates with the tab 165 to hold the latch out of normal position once it is rocked in the counterclockwise direction. The spring 161 attached at the lower end to latch 151, at its upper end encircles the end of detent 166 and tends to hold the parts together in operating relationship.

The rear end of each detent 166 is formed with an overturned portion 169 in the path of a zero or error key. Depression of such a key serves to strike portion 169 and rock the detent 166 in a clockwise direction to release a related latch 151 should the latch have been operated by any other key in the same bank. Thus should any amount key be depressed in error without the need for any other amount to be entered in the same bank, the zero key may correct the setting by freeing the latch 151 so that it again holds the actuator 139 in the zero position.

The error key stem 142 in the special key banks corresponding to the zero key stems in the amount banks, exercise a similar control in operating an associated slide 146 to release the previously depressed key and at the same time, through lever 162, operate detent 166 to release latch 151 for movement to a position relatching actuator 139.

Near the end of each operating cycle, the levers 162 are operated to push slides 146 and release all depressed keys, and at the same time detents 166 are rocked to release latches 151 so that they may again engage actuators 139. This release operation is taken care of by a bail comprising a pair of side arms 170, Figs. 5 and 11, and the tie rods 171, 172. The bail is pivoted on rod 167 and the left arm 170 is formed with a depending portion 173 articulated with a link 174. The other end of the link 174, Figs. 2 and 6, is pivoted on the top of a cam follower arm 175 fulcrumed on a stud 176 on the left side frame 59. A spring 177 rocks the arm so that a roller 178 thereon remain in constant contact with a cam 179 attached to drive shaft 102.

As the cam 179 turns in operation, an extension thereon operates the follower arm 175 to rock it in a counterclockwise direction (Fig. 2) near the end of the cycle. Link 174 is then pushed to the left, and bail arms 170 are rocked in a clockwise direction, Fig. 11.

Rod 171 extends across the machine in front of levers 162. When the rod moves towards the rear it pushes levers 162 before it and these levers operate slides 146 to release all depressed keys.

The other rod 172 is raised to contact the lower edges of detents 166 and swing them in a clockwise direction so that shoulders 168 are moved out of the path of offsets 165 on latches 151. Thus, the latches are released at the end of each operation to assume the position wherein they latch actuators 139.

The foregoing description of the keyboard is devoted mainly to basic key construction and type of operation common to all classes of keys. Although frequent reference is made to the special transaction bank of keys shown in Fig. 11 it is understood that the construction noted up to this point is general.

The five banks of amount keys are the means for setting five associated actuators 139 in differential positions. According to the position of the key depressed, the actuator is moved 1-9 steps. These amount actuators are formed with rack teeth 189, Fig. 4, for operating an accumulator to add or subtract the amounts set up on the keyboard. Other connections are operated by these amount actuators for setting punches to perforate a record of the amounts set up. Additional indicator devices are adjusted by the four lower order amount actuators to disclose to the customer the amount set up by the clerk at the time of the sale. All these separate controls exercised by the setting of the amount actuators is described more fully hereinafter with reference to the related mechanisms.

The banks of clerk and department keys are similar in construction and operation to the amount keys, the only difference being that the actuators 139 co-operating therewith do not have gear teeth for operating the accumulator; nor do they have connections to the indicator. However, a record is preserved of the settings made in these banks by perforating a record of the settings.

The transaction bank of keys shown in Fig. 11 is provided with special devices for selecting adding, non-adding or subtracting operation according to the nature of the operation designated by the key depressed. The transaction keys exercise three different forms of control over the accumulator; namely, addition, subtraction, and non-add operation. As illustrated in the present disclosure, the key at the extreme right in Fig. 11 is designated a "Cash on account" key. This key is designed to permit a non-add type of control to exist in the accumulator.

The second and third keys on the right in Fig. 11 are constructed to make a setting for subtraction in the accumulator. They are designated respectively "Merchandise returned on account" and "Merchandise returned for cash."

The key at the extreme left of the transaction bank shown in Fig. 11 is an error key which does not change the accumulating control from a non-add condition, but is adapted to restore any erroneously depressed transaction key and at the same time trip the related latch 151 to hold the transaction actuator 139 in normal position in the same fashion as the type of operation set forth hereinbefore with reference to the zero amount key.

The three keys to the right of the error key are designed to effect an adding operation in the accumulator. They represent "Cash," "Charge," and "C. O. D." transactions.

The accumulator control devices in the transaction bank of keys are so designed that any arrangement of keys may be made to suit the requirement of any retail store in which the machine is to be used; in other words, the keys may be re-arranged so that the subtraction keys appear at the front of the keyboard rather than the adding control keys; then, too, any number of one or the other variety of keys may be used. If desired the different keys could be interspersed with adding and subtracting keys in alternate positions along the transaction bank.

Pivoted on studs 190 fixed in the wall of the transaction bank channel 131 are a series of accumulator control bell cranks 191 and 192. These cranks are loose on studs 190 and removable therefrom, but are held in position by offsets 196 which contact the sides of the keys to hold the cranks from slipping off the studs 190. The horizontal arms of the cranks are formed with offsets 193 projecting in notches 194 cut in the sides of the transaction keys. This forms an operating connection to rock a crank when an associated key is depressed. The cranks 191 are formed with short vertical arms while the cranks 192 have longer vertical arms reaching down near the lower flange of the channel 131. The two long armed cranks 192 are operated by the keys at the right of the transaction bank (Fig. 11) for the control of subtraction. The other three short-armed cranks 191 are operated by the keys at the left of the transaction bank for the control of addition.

All the cranks 191 and 192 co-operate with a horizontal slide 197 which is slotted and guided by rivets 195 attached to the wall of channel 131. Washers on rivets 195 hold the slide 197 spaced away from the side of channel 131. The slide 197 is formed with two sets of projections 198 and 199. The short-armed cranks 191 co-operate with the upper projections 198 and the long-armed cranks 192 co-operate with the lower projections 199. Thus the slide 197 is adapted to assume three different positions: Normal position which is maintained when a key such as the "Cash on account" is depressed, another position slightly to the left (Fig. 11) when operated by a short-armed bell crank 191, and a third position still further to the left when operated by long-armed bell crank 192. Referring to Fig. 6 it is noted that the transaction channel 131 is formed with a slot 200 through which protrudes a stud 201 fixed on the accumulator control slide 197. Co-operating with the stud is an accumulator control lever 202 pivoted on stud 203 on the left side frame. A spring 204 holds the lever against the stud 201 and tends to move the slide 197 (Fig. 11) to the right, pressing the projections 198 and 199 against the operating bell cranks. The accumulator control lever 202 is described more fully hereinafter with reference to the accumulating devices.

The actuator 139 associated with the transaction bank of keys differs from the amount key actuators by failing to have accumulator actuating teeth formed thereon. However, the actuator has connections to punch control members for setting a punch so that a record is made of the transaction key operated for each sale.

*The interlocks*

The machine is provided with a series of interlocks for preventing mistakes in operation. These devices compel the depression of a transaction key before the operating key is effective to release the clutch devices for a cycle of operation. Other devices are designed to prevent operation of the machine when any of the keys are partially depressed. The same devices work in a reverse fashion to prevent operation of any of the keys after the machine starts to operate.

Considering first the means for releasing the clutch devices by operation of one of the transaction keys, reference to Fig. 11 discloses an interlock operating slide 205 which is slotted to slide on studs 206 on the inner wall of the transaction key release slide 146. This slide 205 is confined in place adjacent the transaction keys between the shoulders on studs 206, Fig. 15, and the sides of the keys. The slide 205 carries a series of pins 207, Fig. 11, which are normally positioned in the notches 150 of the transaction keys. When any transaction key is depressed, the slide 146 is moved to the right by cam face 148. Slide 205 is moved along therewith because of the cooperation of the studs 206 with the right end of the slots in the slide. However, slide 205 does not follow slide 146 back to the left when projection 147 drops into notch 150, because as a key is depressed, the upper edge of notch 150 cams the associated pin 207 to the right until the rear edge of the keystem contacts the side of the pin. Thus, as a transaction key is depressed, slide 205 is moved to the right, Fig. 11, and then held there as long as the key is locked down.

Figure 4:
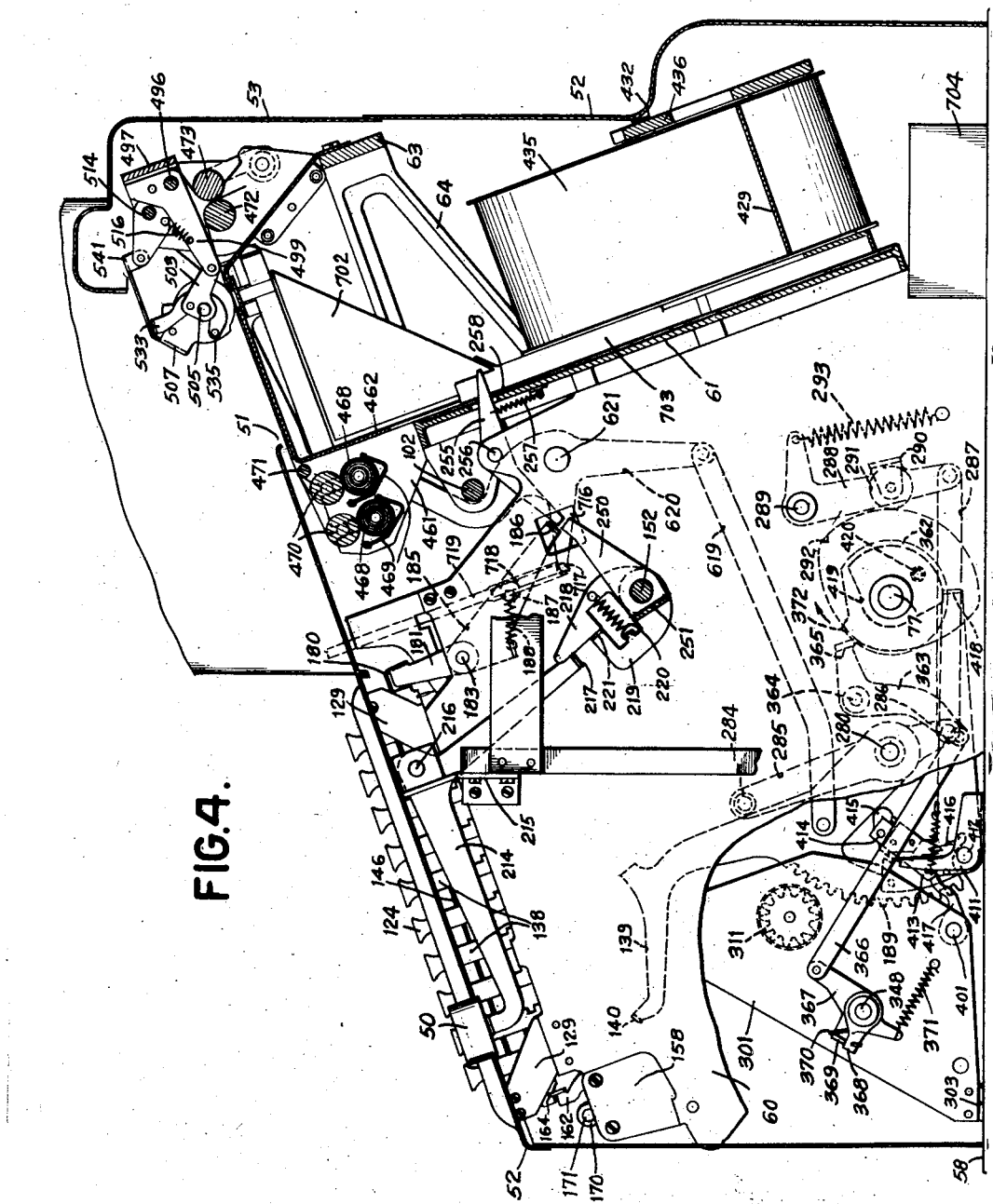
Figure 4 is a sectional elevation view taken at the right side of the machine and directed through the carbon rolls and serial numbering device.

Abutting the rear end of slide 205, Fig. 11, is a lug 208 on a lever 209 loosely pivoted on a stud 184, Fig. 17, fixed to the right side frame 59 in axial alignment with shaft 182. When the slide is operated, lever 209 is rocked in a counterclockwise direction, Fig. 6, so that the end of a locking arm 210 thereon is moved out of the path of an arm 213 fixed to the clutch release shaft 152. A spring 211 drawn between lever 209 and a stop stud 212 on the left side frame, tends to hold lever in a position blocking the operation of arm 213. This arm tends to turn whenever an operating lever 214, Fig. 4, is depressed by the operator of the machine. If no transaction key is depressed before operation of lever 214, the operation is ineffective because lever 209 blocks the rocking of shaft 152.

Attached to the right side frame 60 is a bracket 215 carrying a stud 216 which acts as a fulcrum for the operating lever 214. At the front end, the lever is provided with the touch bar 50 which projects up through an opening in the case as shown in Fig. 1. The rear end of lever 214 is formed with an offset 217 co-operating with a flexible operating member 218 loosely pivoted on shaft 152. Co-operating with member 218 is a shaft operating arm 219 fixed to shaft 152 and drawn into contact with member 218 by a spring 220 which normally holds the two parts together with an offset portion 221 formed on arm 219, abutting against the front face of member 218. When the touch bar 50 is depressed by the operator of the machine, the operating lever 214 is rocked in a counterclockwise direction and the extension 217 thereon moves member 218 in a clockwise direction about shaft 152. When this is done, spring 220 is stretched to pull arm 219 and shaft 152 along with member 218. If the operator of the machine has failed to depress a transaction key, the shaft 152 (Fig. 2) is locked by arm 210 obstructing arm 213 on the shaft, preventing motion of arm 219 and causing member 218 to move idly to the right (Fig. 4) stretching spring 220 without being followed by arm 219 and shaft 152. Should a transaction key be depressed before operation of the bar 50, the shaft 152 is free for operation and the arm 219 fastened thereon follows along with member 218 when the member is rocked in a clockwise direction.

As shaft 152 rocks in a clockwise direction to release the clutch devices, an arm 222 (Figs. 3 and 17) fastened near the right end of the shaft, pulls a link 223 attached to the clutch latch releasing lever 224. Lever 224 (Fig. 9) is pivoted on stud 90 and formed at the lower end with a projection 225 co-operating with an offset 226 on latch 89. When the link 223 is pulled by the connections mentioned hereinbefore, lever 224 is rocked in a counterclockwise direction, striking offset 226 and rocking latch 89 out of engagement with the clutch dog 86, thus releasing the clutch devices for connection with the driving means to operate the machine.

The front end of lever 224 is formed with a projection 227 co-operating with a cam formation 228 on the clutch plate 88. The cam action between 227 and 228 is provided to restore the lever 224 and latch 89 to normal position near the end of an operating cycle, should the touch bar be held down by the operator. The cam is effective near the end of a cycle of operation. When latch 89 is moved out of latching position to free the clutch dog 86, it is held in such an operated position by a detent lever 229 pivoted on a stud 230 on an arm 231 of the casting 46. The detent 229 is formed with a shoulder 232 co-operating with a tab 233 formed on the latch 89. A spring 234 drawn between studs on the latch and the detent tends to hold the detent into co-operation with the latch so that when the latch is operated, the detent may be made to swing in position to place shoulder 232 against tab 233 preventing the return of the latch until late in the operating cycle.

A lever 235 cooperates with the detent 229 to actuate the detent and release the latch 89 towards the end of the operating cycle, so that the latch may again engage the dog 86 to move it out of clutching position. Lever 235 is pivoted on stud 90 and formed with an extension 236 engaging a pin 237 on the upper horizontal arm of detent 229. The left end of lever 235 (Fig. 9) is formed with a cam projection 238 in the path of stud 239 on clutch plate 88. Another projection 240 on lever 235 contacts the bar 248 at the top of casting 46 to act as a stop, holding the lever in position to be operated by pin 239. As the plate 88 turns near the end of the single cycle of operation, pin 239 strikes the front end of cam face 238 and rocks lever 235 in clockwise direction. The extension 236 depresses pin 237 and moves detent 229 so that shoulder 232 is withdrawn from tab 233, freeing the latch 89 so that it may return to latching position. To insure the return of latch 89 the lower portion of lever 235 is formed with another projection 241 shaped to cooperate with the rear of tab 226 to push latch 89 down into latching position after the detent 229 has been moved to release the latch.

As the clutch latch 89 is moved to free the dog 86 to connect the clutching devices for a cycle of operation, contacts 242 (Fig. 9) are closed to complete an electric circuit through the driving motor 67. A piece of insulation 243 is interposed between a projection 244 on latch 89 and the lower blade of the contacts 242. When the latch 89 is rocked in counterclockwise direction, the insulation piece 243 is shoved to the right to close contacts 242.

Although the latch 89 is released by operation of the detent 229 at a point near the end of an operating cycle, it is desired that the contacts 242 remain closed longer, so that the motor may be energized until the end of the cycle. For the purpose of sustaining the circuit through the motor 67 by maintaining contacts 242 closed, the insulation piece 243 is secured to a lever 245 for holding the insulation piece to the right after latch 89 moves towards the left. The lever 245 is formed in the shape of a bail pivoted on stud 90. In addition to the arm attached to insulation piece 243, the lever 245 is formed with another arm 247 co-operating with a pin 246 on clutch plate 88. This arm 247 is formed with an arcuate surface which conforms with the arc described by pin 246. Near the end of the cycle, pin 246 passes along the arcuate surface of arm 247 holding lever 245 to the right, closing contacts 242 until near the very end of the cycle when the end of arm 247 may escape to the left of pin 246.

In addition to the interlock connections to the clutch latch 89 from the transaction keys and operating lever noted hereinbefore, other locking connections are provided to prevent the release of the latch should any of the keys be partially depressed.

Across the rear of the keyboard, behind the rear edge of slides 146, Fig. 11, is a bail 180 formed with a pair of side arms 181 fixed on a shaft 182, Fig. 17, pivoted on studs 183 and 184 fixed on the side frames. Also fixed to shaft 182 is an interlock arm 185 formed with a long offset 186. A hole in arm 185, Fig. 4, encircles a stop stud 187 on side frame 60. A spring 188 connected between stud 187 and a tab on arm 185, tends to rock the arm in a counterclockwise direction and to place bail 180 against the rear edge of key slides 146. The stud 184 is riveted in frame 59, but stud 183 is adjustable and removable because it is held in frame 60 with a set screw. Thus shaft 182 may be removed by sliding stud 183 to the right.

Cooperating with the offset 186 of interlock arm 185 is an arm 250, Figs. 3, 4 and 17, formed as part of a bail 251 loosely pivoted on shaft 152. The other arm 252 is articulated to the top end of a link 253 the lower end of which is pivoted to an arm 254 formed as part of latch 89, Fig. 9.

Whenever a key stem 138 (Fig. 11) is fully depressed, the locking slide 146 moves back and forth over the cam face 148. This motion is communicated to the bail 180 which rocks the arm 185 to oscillate offset 186 (Fig. 4) down and up in front of the arm 250.

Should the depressed key be only partially depressed, the offset 186 will remain down obstructing counterclockwise motion of arm 250. As noted in Figs. 3 and 9, it is necessary for arm 250 to be free for counterclockwise motion when latch 89 is to be moved to an operated position. Therefore, when a key is partially depressed, offset 186 obstructs motion of bail 251 preventing the rising of link 253 and holding latch 89 in the normal position.

This same interlock is adapted to be effective in a reverse manner to prevent operation of any key during operation of the machine. Reference to Fig. 4 discloses that the upper end of arm 250 is shaped to pass under the lower end of offset 186, thus holding the connected bail 180 against the rear end of slides 146 (Fig. 11) preventing rearward motion of the slides 146, which motion is caused by the depression of a key. As soon as the latch 89 is operated to condition the machine for operation, the arm 250 is moved to a position preventing operation of any keys through a linkage comprising bail 251, arm 252, link 253, and arm 254 on latch 89.

The lever 235 (Fig. 3) also serves to restore bail arm 250 positively, should spring 234 (Fig. 9) fail to act to draw the arm down below offset 186 (Fig. 4). This offset 186 is part of the bail 180 which is operated positively near the end of each operation by the rod 171 (Fig. 11) releasing the keys. The projection 241 (Fig. 9) on lever 253 acts against offset 226 to turn latch 89 and connected arm 254 in a clockwise direction near the end of each cycle. This operation of arm 254 moves link 253 down and restores the connected bail 251 (Fig. 4).

Other interlock devices are provided to prevent operation of the machine when the perforated card stock is exhausted and when the roll of record strip material retained in the machine becomes full. These devices act through the offset 186 (Fig. 4) on the key locking lever 185. They serve to hold this offset over in the path of the arm 250 to prevent release of the clutch latch 89.

In Fig. 4 there is shown a lever 255 pivoted on a stud 256 on the right side frame 60. The end of the left arm of lever 255 underlies the offset 186, but it is normally out of the path of the offset. A spring 257 draws the right arm of lever 255 down into contact with the top of a slide 258 (Fig. 7) moved behind the rear frame 61. The right end of slide 258 is pivotally supported at 259 on a lever 260 pivoted on stud 261 on the rear frame 61. The other end of slide 258 is slotted at 262 to encircle a pin 263 on a lever 264 pivoted on screw 265 on the rear frame. A spring 266 attached to lever 260 draws the lever and the attached slide 258 to the left to normally hold a notch 267 in the slide, out of the path of the rear end of lever 255. However, when the record strip roll 268 (Fig. 34) approaches its maximum diameter, the lever 260 (Fig. 7) is rocked in a counterclockwise direction, drawing the slide 258 to the right and placing notch 267 under lever 255 (Fig. 4), freeing the lever 255 for operation by spring 257 (Fig. 4) which urges the other end of the lever against the lower side of offset 186. Then, the first time a key is depressed, as soon as offset 186 moves to the left of the end of lever 255, the lever springs up to obstruct the return motion of offset 186, and thus holds the offset in position to block arm 250 and hold the clutch latch 89 from being released. When the operator of the machine notices that depression of the keys fail to free the machine for operation, he will become aware that the record roll 268 should be removed and a new roll started.

Returning now to consideration of the mechanical connections between the record roll 268 (Fig. 34) and the interlock operating lever 260 (Fig. 7), it is noted that an arm 269 (Fig. 34) is pivoted at 618 and formed with a projection 270 contacting the surface of the record roll 268 when the roll approaches the largest allowable size. At the end of arm 269 is connected a wire 271 (Fig. 7) which extends down to abut against the upper surface of a tab 272 formed on a horizontal arm of lever 260. When the roll 268 becomes too large (Fig. 34) arm 269 is depressed, lowering wire 271, rocking lever 260 and moving slide 258 to the right (Fig. 7) to operate the interlock.

At the other end of slide 258, connections are provided to shove the slide to interlock operating position when the perforation receiving material is exhausted. The slot 262 in slide 258 permits free operation of the record roll interlock at the right end of the slide without disturbing lever 264, and the loose connection between wire 271 and tab 272 permits operation of the other card stock interlock without interference.

The card material 429 (Fig. 7) passes to the left of a pair of studs 274 and 275. Pressing against the left side of the material between studs 274 and 275 is a projection 276 on lever 264. A spring 277 attached to lever 264 maintains the contact between projection 276 and material 429 as long as such material is present between the studs. As soon as the material is exhausted, the space between the studs is open and the projection 276 is free to move to the right as urged by spring 277. When the lever 264 moves, the stud 263 therein shoves the slide 258 to the right, bringing the notch 267 under the lever 255, freeing it for the locking operation mentioned hereinbefore.

*The actuator operating and restoring devices*

Referring to Fig. 18, it is noted that the machine is provided with ten actuators 139; five amount setting actuators, two overflow amount actuators, and three special character setting actuators. The first seven actuators to the right are provided with rack teeth 189 for operating accumulating mechanism. The other actuators are formed plain without such rack teeth. All the actuators are freely mounted on a shaft 280 (Figs. 2, 4, and 18) mounted in the main side frames. Each actuator is urged towards the rear of the machine by spring 281 (Fig. 2) fastened at one end to a stud 282 on the actuator and at the other end to an angle bracket 283 fastened against the inside of the rear frame 61. The actuators are normally prevented from rocking towards the rear of the machine by an actuating and restoring bail comprising a restoring rod 284 and a pair of side arms 285 fastened to shaft 280.

The lower end of the right-hand restoring bail arm 285 is formed with an extension 286 to which is attached a link 287 connected at the rear end to a cam follower lever 288 pivoted on a stud 289 on the side frame 60. The lever 288 is formed with a bearing projection 290 carrying a follower roller 291 adapted to co-operate with the cam 292 on the main drive shaft 77. A strong spring 293 connected to lever 288 urges the roller 291 into constant co-operation with cam 292.

Since the shaft 77 is rotated in a clockwise direction (Fig. 4) the formation of cam 292 provides a dwell during the first part of the operating cycle, through which part the restoring bar 284 remains in normal position. During the remaining part of the first half of the operating cycle, cam 292 is formed to allow a clockwise motion of follower arm 288 and a consequent rearward motion of restoring rod 284. A short period of dwell ensues, followed by a return motion of the restoring means to bring the actuators positively back to normal position, after which the cam 292 continues to move with a dwell surface co-operating with the follower roller 291. In other words the actuator restoring devices are designed to permit a spring-operated rearward rocking movement of the actuators during the first half of the operating cycle, followed after a dwell by a positive forward restoring operation.

As noted hereinbefore, the distance through which any actuator 139 travels on a data entering cycle, is determined by the position of a depressed key in the related bank of keys. After moving through a differential distance of 1-9 steps, the actuator is stopped against the end of a key, while the spring 281 continues to stretch during most of the first half of the operating cycle. Then in the second half of the cycle, the restoring rod 284 engages the actuators in the various positions and moves them all back positively to the normal latched position.

*The accumulator*

The machine is equipped with an adding and subtracting accumulator of seven orders for keeping an account of the amounts entered. The five lower orders of this accumulator are operated under control of the five banks of amount keys, and the two higher orders are provided to receive overflow transfers from the lower orders.

The accumulating devices are held together in a removable unit comprising a pair of side frames 300, 301, Figs. 2, 4, 5 and 19, and a connecting casting frame 302 between the frames. To the lower end of each frame is attached an angle 303 which is screwed to the base 58. At the upper end the unit is held in place by a rod 304 passing through both frames 300, 301 and removably held in the main side frames 59 and 60 by a set screw.

Extending across the inside of the unit is a bar 305, Figs. 19 and 20, which is part of a sliding bail including side arms 306 that are attached to the bar and slotted to fit on square guide studs 307 on the accumulator side frames. Each arm 306 has a forwardly extending portion in which is fixed a pin 308 protruding through a hole in the end of an operating arm 309 fixed to a pinion shifting shaft 310.

Each order is provided with an accumulator wheel composed of a pinion 311 and an indicating drum 312 held together by a hub 313. A transfer control stud 314 fixed between the drum and a hole in one of the teeth of the pinion also holds the drum and pinion together. The accumulator wheels are loosely pivoted on individual studs 315 projecting from separate brackets 316 attached to bar 305. When the bar 305 is shifted back and forth by arms 309, pinions 311 are moved along therewith and carried in and out of mesh with the actuator rack teeth 189.

The rotation of the pinions in either an adding or subtracting direction is determined by the times at which they are thrown in and out of mesh with the actuator teeth. If they are engaged early in the cycle and disengaged before the second half of the cycle they are moved in a counterclockwise subtracting direction Fig. 19 by the forward stroke of the actuators. And if they are engaged near the middle of the cycle and demeshed late in the cycle, they are moved in a clockwise adding direction by the return stroke of the actuators. The engagement timing of the pinion shifting bar 305 is controlled by the transaction bank of keys. However before discussing the control of timing, it is well to describe the operating parts for pinion shifting.

Attached to the shaft 310, Fig. 19, carrying the shifting arms 309, is an arm 317 Figs. 2 and 6 formed with a tab fitting in a slot in an operating lever 318 located adjacent arm 317 but loose on a stud 319 on side frame 59 in alignment with shaft 310. The tab and slot construction and the separate mountings for the parts are provided to make the accumulator unit easily removed. A spring 320 attached to lever 318, holds the lever against a stop stud 321 and tends to hold the pinions out of mesh with the actuators.

Pivoted at 323 on the top of lever 318 is a rearwardly extending link 324 with an abutting surface 325 adapted to co-operate with either of a pair of overturned lugs 326 and 327 formed on a separate pinion shifting arms 328 and 329. In the normal position of the link 324 the abutting surface 325 is located beneath lugs 326 and 327 and out of their path of motion. When the parts are so positioned, the accumulator pinions are not shifted during operation of the machine and they remain out of engagement with the actuators with the result that a non-add operation ensues.

As shown in Fig. 2, the link 324 is lifted slightly in alignment with the lug 327. When so positioned the parts are conditioned for an adding operation, and the pinions are shifted under control of lever 329.

If the link 324 is lifted still higher it co-operates with lug 326 in preparation for a substracting operation.

Both levers 328 and 329 are fulcrumed on a common stud 330 projecting from the left side frame 59. A pair of springs 331 attached to the lower end of levers 328 and 329 draw the lower end of the levers towards the rear of the machine and place rollers thereon into co-operation with cams attached to the main shaft 77. The lever 328 carries a follower roller 332 co-operating with a cam 333 shaped to cause a rocking of the lever early in the operating cycle for subtraction operation. The other lever 329 carries a roller 334 co-operating with a cam 335 designed to hold the lever in position during the first half of the cycle, and permit it to operate early in the second half of the cycle for meshing the accumulator pinions in time for an adding operation.

The linkage for the pinion meshing operation may be traced through the parts shown in Figs. 2 and 19. When either of the levers 328 or 329 operate, the lugs 326 and 327 (Fig. 2) move to the left and shove the link 324 towards the front of the machine. The link turns lever 318 in a counterclockwise direction, rocking the arm 317 along therewith. Shaft 310 (Fig. 19) being attached to arm 317 is also rocked in a counterclockwise direction. The arms 309 are articulated to the bail including bar 305 and they are also rocked in a counterclockwise direction to shove the frame to the right to engage the pinions 311 with the rack teeth 189 on the actuators 139.

Turning now to consideration of control over the timing of accumulator pinion meshing by the transaction keys, it is noted in Fig. 6 that the lever 202, referred to hereinbefore as co-operating with the stud 201 moved by transaction keys, is formed with a rearwardly extending arm 336 with extensions contacting the upper and lower edges of link 324. In the normal position of lever 202, when it is held against the stop stud 337 by spring 204, the link 324 is positioned thereby so that abutting face 325 stands below the operating lugs 326 and 327. This is the condition of the parts when the stud 201 remains in normal position due to the depression of a non-add key or the failure to depress any of the transaction keys.

As soon as any of the transaction keys controlling adding are depressed, the stud 201 is moved to the right, moving lever 202 in a clockwise direction and lifting link 324 into co-operation with lug 327. This setting results in an adding operation, due to the late meshing of the accumulator pinions as caused by the formation of cam 335 cooperating with the lever 329 carrying lug 327.

Should any of the subtraction control transaction keys be depressed, the stud 201 is moved two steps to the right, rocking lever 202 through a greater arc of movement to lift link 324 into co-operation with lug 326. Subsequent operation of the machine results in an early meshing of the accumulator pinions by cam 333, causing a subtraction operation in the accumulator.

Both cams 333, 335 are formed to demesh the accumulator pinions when the actuators dwell after turning the pinions. When they go out of mesh with the actuators, the pinions mesh with transfer racks which may be moved for carrying. After the transfer operation, either cam 333, 335 again operates to mesh the pinions with the actuators so that the transfer racks may be restored. At the end of the cycle the cams are again active to bring the pinions out of mesh and in normal position.

*The transfer devices*

The accumulator unit is provided with transfer devices for carrying units to and borrowing units from higher orders when lower orders pass from 9 to 0 in adding, or from 0 to 9 in substracting.

When out of mesh with the actuators, the accumulator pinions 311 each co-operate with a pair of rack teeth on a transfer slide 338 guided by a pair of notched bars 339 and 340 fixed between the accumulator side frames. This transfer slide is adapted to be moved up or down a step of movement to effect an adding or subtracting transfer operation. The lowest order transfer slide is held in position to serve merely as a detent for the units order pinion.

Pivoted on studs 341 on each of the pinion brackets 316 are a series of transfer control pawls 342, co-operating with the studs 314 on the accumulator wheels. In the normal zero position of an accumulator wheel, the stud 314 contacts the side of a pointed cam face on the transfer pawls 342, as shown in Figure 19.

Clockwise rotation of the pinion during an adding operation carries the stud 314 away from the transfer pawl until the "9" position is reached, when the pin strikes the pawl and pushes it down when passing from 9 to 0. When moved in a counterclockwise subtraction direction, the pin 314 operates pawl 342 when passing from 0 to 9.

Co-operating with each of the transfer pawls 342 is a transfer latch 343 formed as a bail loosely pivoted on a rod 344 passing through extending ears on the accumulator casting 302. The top surface of the horizontal arm of latch 343 coincides with the lower edge of the left end of pawl 342 so that the downward operating motion of the pawl is communicated to the latch. Pawl 342 may slide along the arm of latch 343 so that it may operate to transfer when either in or out of mesh with the actuator.

Each transfer latch 343 is formed with a tab 345 co-operating with a shoulder 346 on a transfer operating lever 347 loosely pivoted on a shaft 348. A spring 349 connected between the lower end of lever 347 and the bail portion of transfer latch 343, holds the latch against pawl 342, positions the pawl in contact with stud 314, and holds the shoulder 346 up against tab 345.

When a pawl 342 is operated by stud 314, the latch 343 is rocked in a counterclockwise direction (Fig. 19) and tab 345 is moved away from shoulder 346. Then operating lever 347 is free to rock in a counterclockwise direction under the urging of spring 349. It moves in this way through a very short distance before it strikes a rod 350 supported on a pair of transfer control arms 351 attached to shaft 348. The transfer operation is delayed by rod 350 until the pinions 311 move out of mesh with the actuators and into mesh with the transfer slides 338.

A pair of pins 352 and 353 on the side of transfer lever 347, at opposite sides of pivot 348, form part of the means for communicating transfer motion in either direction to the slide 338. As shown in Figure 19, the stud 353 is engaged by an opening 354 in a transfer member 355 pivoted at 356 on the transfer slide 338. When the transfer parts are so positioned, they are conditioned for an adding transfer which occurs when spring 349 pulls lever 347 in a counterclockwise direction, when permitted to do so by rod 350, raising transfer member 355, pushing slide 338 and turning pinion 311 one step in clockwise adding direction.

At the lower end, the transfer members 355 are formed with slots 357, engaging a rod 358 which may be moved to shift the members so that opening 354 moves away from stud 353 and another opening 359 in member 355 encircles the pin 352. The mechanism for operating a pair of arms 360 carrying rod 358 are described hereinafter with reference to the means for setting for subtraction.

When transfer lever 347 is permitted to operate while pin 352 is effective, the member 355 is drawn down rather than being moved up, and transfer slide 338 is moved so that the teeth thereon turn the accumulator pinion 311 one step in counterclockwise subtracting direction.

The wearing surfaces of the inner sides of openings 354, 357 and 359 in members 355 are improved by turning up offset extensions to engage the pins 352, 353 and rod 358. The member 355 is guided for the rocking and sliding motion by a pair of slotted angle plates 361 fastened between the side frames of the accumulating unit.

A cam 362 (Fig. 2) fixed to the main shaft 77, controls the operation and restoration of the transfer levers 347. Co-operating with the cam 362 is a bell crank 363 pivoted on a stud 364 on the right side frame. The crank is formed with an overturned lug 365 resting on the periphery of cam 362. Pivoted to the lower end of crank 363 is one end of a link 366, the other end of which is pivoted at the upper end of a lever 367 (Fig. 4) loosely mounted on the shaft 348 carrying arms 351 (Fig. 19). Adjacent to lever 367 and attached to shaft 348 is an arm 368 underlying a projection 369 on lever 367. A coil spring 370 is wound around shaft 348 with the ends contacting arm 368 and projection 369 and tending to hold the two parts together during operation. A spring 371 is attached to the lower end of lever 367 to urge the linkage comprising lever 367, link 366, and bell crank 363 into normal position with projection 365 bearing on the surface of cam 362.

A depression in cam 362 co-operates with extension 365 late in the operating cycle to permit rocking of bell crank 363 and operation of the transfer devices. When the bell crank 363 is permitted to rock in a clockwise direction (Fig. 4) the lever 367 is pushed in a counterclockwise direction by link 366. The shaft 348 is carried along with lever 367 through the connection between projection 369 and arm 368 on shaft 348. The other arms 351 (Fig. 19) between shaft 348 and rod 358 are also rocked in a counterclockwise direction, out of the path of levers 347, permitting operation of the levers.

The return motion of rod 358 to restore all the transfer levers 347 is accomplished through the flexible connection including spring 370 (Fig. 4). As projection 365 moves up a cam face 372 formed on cam 362, the rod 358 (Fig. 19) is moved up a slight amount beyond the normal position. This is done to draw the shoulders 346 on levers 347 below the tabs 345 so that they may again assume a latching position.

Before the described transferring operation occurs, the members 355 (Fig. 19) are shifted into adding or subtracting position by rod 358 mounted on arms 360 connected to shaft 373. The members 355 are normally positioned as shown in Fig. 19, in readiness for an addition transfer. The rocking movement of shaft 373 to put the parts in condition for a subtraction transfer is controlled by the position of the subtraction setting lever 202, Fig. 2. Cooperating with the rear end of lever 202 is a transfer setting lever 374 pivoted on a stud 375 on the left side frame 59. At the upper end of lever 374 is pivoted one end of a link 376, Figs. 5 and 6, the other end of which is pivoted on a crank 377 loosely mounted near the end of shaft 373.

A projection 378 on crank 377 contacts the side of an arm 379 fastened to shaft 373 adjacent the crank. A coil spring 380 between the crank and the arm tends to hold the parts together so that when crank 377 is restored in a clockwise direction, Fig. 6, arm 379 and shaft 373 will follow along therewith. If for any reason the shaft 373 is prevented from returning to an adding control position, the spring 380 yields allowing retention of arm 379 in the operated position.

Another link 381, Figs. 2 and 6, is pivoted at the top of lever 374 and articulated at the other end on the top of a cam follower arm 382 pivoted on stud 176 on the left side frame. The arm carries a roller 383 coperating with a cam 384 fixed to operating shaft 102.

The spring 177, Fig. 6, is connected to lever 374 and tends to rock the lever in a counterclockwise direction, pushing link 381 to the left and holding roller 383 against cam 384. Early in the operating cycle, a depression in cam 384 passes under roller 383 so that if the linkage 381, 374, 376, 377, and 379 is free, it may move to the left. The movement of the linkage depends on the position of the lever 202. If the control lever 202 is in the subtraction selection position the linkage is free to move and rock shaft 373. When lever 202 is in the non-add and add positions, the finger at the lower end of lever 374 is obstructed from movement to the right.

With the end of lever 202 elevated to the subtraction position, the finger of lever 374 is unobstructed, so that when the cam depression is encountered by roller 383, the entire linkage connected to lever 374 is moved by spring 177. The finger passes under and locks lever 202 in a raised position. The shaft 373 is rocked in a counterclockwise direction, Fig. 6, and the connected rod 358, Fig. 19, is moved to the right to shift members 355 so that openings 359 engage pins 352, conditioning the parts for a subtractive transfer.

Near the end of the operating cycle, a raised surface on cam 384, Fig. 6, operates through roller 383 to move the transfer control linkage to the right, rocking shaft 373 in a clockwise direction, and bringing members 355, Fig. 19, back to the normal addition transfer control position.

The amount registered on the accumulator wheels at the end of any accounting period, may be observed by the proprietor of the machine when he unlocks and opens the door 57, Fig. 1, in the case. Behind this same door is a restoring key which may be operated to bring all the accumulator wheels back to zero position.

*The accumulator restoring devices*

The machine is provided with restoring or zeroizing devices for clearing the accumulator wheels by bringing them back to the normal zero position. This is done by a single operating cycle of the machine; but before the machine may be operated, certain interlocks must be operated and the transfer devices must be conditioned to stop the wheels at zero. The restoration setting is made by pushing the restoring key 385, Fig. 5.

The restoring key 385 is part of an operating bail comprising a pair of side arms 386, 387 joined by two tie rods 388, 389 and loosely pivoted on shaft 169, Fig. 11. The rod 388 serves to rock all the latches 151 out of actuator holding position when the restoring bail is turned in a counterclockwise direction by depression of key 385. This is done to free the actuators 139 so that they may turn the accumulator wheels to bring them back to zero position.

Propecting from the outside of arm 386, Fig. 5 of the restoring bail, is a stud 390, Fig. 6.

Pivoted on the stud is the right end of a link 391 the other end of which is suspended on a stud 392 at the end of a lever 393 pivoted on a stud 394 fastened to side frame 59. The upper arm of lever 393 is adapted to move against an extension 395 on the transaction key release lever 210. When the restoring key is depressed, lever 393 is rocked in a clockwise direction, Fig. 6, to turn lever 210 a slight amount. This is done to move the end of lever 210 out of the path of interlock arm 213 so that the machine may be operated to restore the accumulator.

The restoring bail operates connections to lock the transfer pawls 342, Fig. 19, in position to stop the pins 314 in the wheels when the wheels reach the zero position. A pin 396, Fig. 6, on the side of link 391, cooperates with a bell crank 397 pivoted on a stud 398 on the left side frame 59. A link 399 connects the crank to an arm 400 fastened on a shaft 401 which extends through the accumulator unit.

Attached to shaft 401, Fig. 19 is a plate 402 the end of which is adapted to be moved against the ends 403 of the transfer latches 343. Through the linkage described, depression of key 385 serves to place plate 402 in position against latches 343, holding the latches up against pawls 342 so that as the pins 314 strike the pawls when zero position is reached, the pawls do not move but hold the wheels at zero.

Since the accumulator wheels may turn a variable distance before pin 314 strikes pawl 342 in restoration, it is necessary that the actuators 139 be moved by spring operation rather than positively during restoring. For this reason, the machine is conditioned to mesh the accumulator pinions 311 just as though a subtracting operation is to be performed, when an accumulator restoring operation is desired. Then the wheels are meshed early in the operating cycle while the actuators 139 are pulled forward by spring tension. A shoulder 404 on link 391 cooperates with a pin 405 on the lower end of meshing control lever 202. When the link 391 is operated, lever 202 is rocked in a clockwise direction to lift link 324 into cooperation with lug 326 to select subtraction timing for meshing the accumulator pinions. As the restoring operation is effected, the actuators position the perforating and indicating devices differentially and they are operated to make a total record as they are operated in subtraction item entering in a manner explained more fully hereinafter.

The link 391, when operated, is held in operated position by a latch 406 pivoted on stud 407 on the side frame. A shoulder 408 on the link is engaged by the hooked end of the latch. A spring 409, connected between latch 406 and crank 397, urges the latch into operating position and at the same time holds the crank against pin 396. A pin 410 on cam 333 cooperates with the rear end of latch 406 late in the cycle to release the restoring bail linkage.

At the end of the first half of the accumulator restoring cycle, the accumulator pinions 311, Fig. 4, are thrown out of mesh with the actuators 139. Then the actuators would jump from the differentially adjusted positions assumed during zeroizing, up against the restoring rod 284 unless prevented from doing so by a retaining means. Such a restraining means is provided in the present machine to hold the actuators in operated position until restored by the return stroke of rod 284. The retaining means comes into play only during an accumulator restoring cycle when key 385 is depressed.

Mounted on base 58, Fig. 18, are a pair of brackets 411 with studs 412 pivotally supporting a retaining bail 413. The bail carries a rod 414 supporting a series of seven retaining pawls 415, one for each amount actuator 139. These pawls are normally out of the path of toothed sectors 416 secured to the amount actuators, being held in such a position by a hooked member 417, Fig. 4, fastened to the shaft 401 operated by the restoring key 385. The member 417 abuts against a shoulder on the right arm of bail 413, holding the bail from moving forward. The same right arm of bail 413 extends towards the rear of the machine and has an offset 418 bearing against the bottom edge of a cam 419 fixed to the main drive shaft 77. The cam 419 is formed to hold the retaining pawls out of operation until the forward motion of the actuators 139 is completed.

Then the depression in the cam permits the offset 418 to rise, rocking bail 413 towards the actuators, and placing the pawls 415 in the teeth of sectors 416. Although the front ends of the pawls 415 are free to rock downward to permit a forward restoring motion of the actuators 139, the rear ends of the pawls bear against the top of bail 413, to prevent further rearward movement of the actuators after the retaining bail is placed in operative position.

The cam 419 is provided with a stud 426 for use in tripping a cash drawer latch should the machine be placed on top of a cash drawer frame.

The machine is provided with means for holding the main driving connections in the normal position. A bracket 421, Fig. 2, is fixed on base 58 and provided with a stud 422 on which is pivoted a notched detenting lever 523. The lever cooperates with a stud 424 on the side of cam 335, Fig. 22. A heavy spring 425, Fig. 2, urges the hooked end of the detent 423 against stud 424 to locate and hold the main shaft 77 in proper position. A stud 426 on detent 423, abuts against the front end of bracket 421 to hold the detent from rocking too far.

*The records*

The machine is adapted to produce three forms of records; a receipt 427, Fig. 24, which is given to the customer making the purchase, a continuous record 428, Fig. 25, for receiving duplicate impressions of the markings on all receipts, and a perforated card 429, Fig. 26, which may be used in a record controlled auditing machine for automatically producing accounting information.

Figure 7:
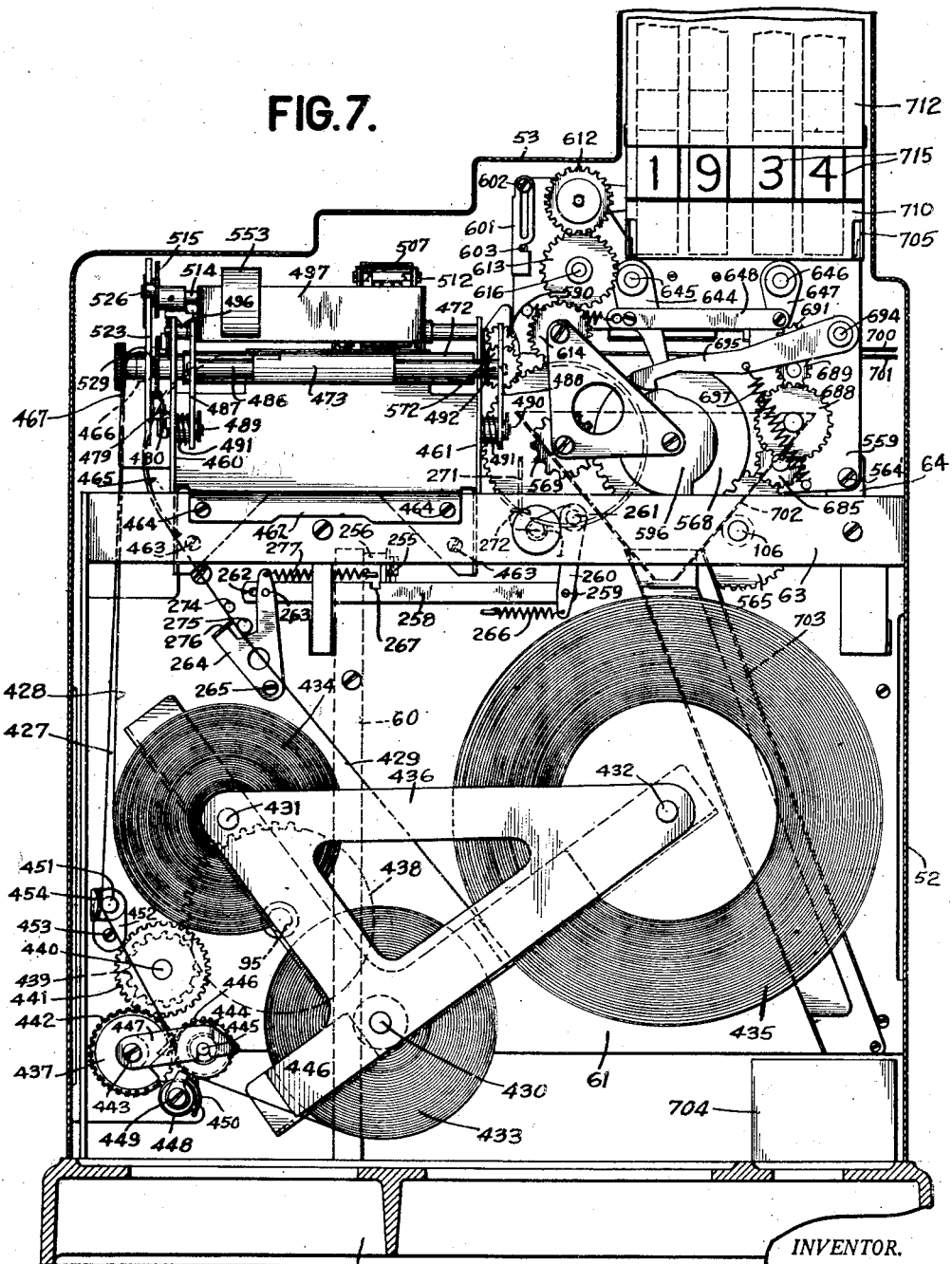
Figure 7 is a rear view showing the record materials and the punch operating mechanism.

Referring to Fig. 7 it is noted that the rolls of record material are pivoted on three studs 430, 431 and 432 projecting from the rear frame 61. A roll 433 of the receipt material 427 is placed on the stud 430, a roll 434 of record material 428 is pivoted on stud 431, and a roll 435 of card stock 429 is assembled on stud 432. A frame 436 placed over the ends of the three studs holds the rolls on the studs.

Before the receipt material 427 reaches the autograph table, receipt forms are printed thereon by an electro roll 437, Figs. 3 and 7. The electro is driven by a gear 438 on shaft 95. The gear cooperates with a Geneva form of pinion 439 attached to a stub shaft 440 pivoted in the rear frame. The gear 438 is formed with gear teeth on only approximately one-third of the periphery with the remainder a smooth concentric surface. Pinion 439, in the normal position, presents a large arcuate tooth against the concentric portion of gear 438. Between the gear and pinion is developed an intermittent drive for the electro 437 which is turned during the first portion of an operating cycle. A gear 441 fastened to the outer end of shaft 440, meshes with a gear 442 fastened to the electro 437. The electro turns in a counterclockwise direction on a stud 443 on rear frame 61.

The receipt material 427 is fed between the electro 437 and a platen roll 444 pivoted on a stud 445. The platen 444 is driven by gear 442 meshing with a gear 446 on the platen. The platen is removable from stud 445, being held thereon by a swinging arm 447 attached to the end of stud 443.

An inking roll 448 on a stud 449 cooperates with the lower edge of electro 437 before it touches the receipt material. The stud 449 also carries a shield 450 which covers the portion of the inking roll near the path of the receipt material.

As the receipt material passes the electro, it is guided by an adjustable stud 451. This stud is fixed in a plate 452 which may be swung about a screw 453 and fastened thereby to the rear frame. A spring clip 454 holds the paper against the stud.

All three record materials move up towards the right side of the machine, the card stock 429 passing to the left, Fig. 7, of the studs 274, 275 as explained hereinbefore.

*The autograph and serial numbering devices*

The autograph and serial numbering devices in the machine are held together on a separate removable unit.

Between side frames 460 and 461, Figs. 3, 4, 7 and 27 of the unit, there is fixed an inverted U-shaped plate 462 fastened to the rear frame 61 by screws 463, Fig. 7, and fastened at the other end to the rear of the bar 63 by screws 464. The top of this plate 462 is used as an autograph writing table since it is located under the autograph opening 51, Fig. 1, in the case.

Attached under the right side of plate 462 is a curved guide 465 (Figs. 3 and 7). This guide forms a means for gradually bending the card stock 429 around to the top of the autograph table. The other comparatively thin record materials 427 and 428 are guided horizontally over a roller 466, pivoted in a U-shaped bracket 467, fastened on the side frame 460.

A pair of carbon papers are interspersed between the three strips of record material, so that all writing impressed on the receipt material is duplicated on the continuous record and the perforated card. Note the written matter shown on the sample forms in Figures 24, 25, and 26. Two carbon paper rolls 468 (Fig. 4) are placed in a pair of troughs 469 fixed between the autograph unit side frames 460 and 461. The carbon rolls are loosely mounted in the troughs, but held down therein by weighted rollers 470, guided by slots in the top of side frames 460 and 461 (Fig. 3). The carbon papers pass over a roller 471 pivoted between the autograph unit side frames before passing between the record materials. The direction in which the carbon paper is fed is at right angles to the path of motion of the record materials. After the carbon papers pass through between the record materials they pass through feed rollers and then are allowed to hang down the rear of the machine over the sloping surface of plate 462.

The carbon papers are fed between a pair of rollers 472 and 473 (Fig. 4), driven by a ratchet and pawl mechanism. The roller 472 (Figs. 27 and 29) is attached to a shaft 474, carrying a ratchet wheel 475. Pivoted on shaft 474, adjacent the ratchet wheel 475, is a lever 476 (Fig. 29) carrying a ratchet pawl 477, co-operating with the ratchet wheel. A spring 478, drawn in between the pawl and an extending finger on lever 476, urges the pawl into co-operation with the ratchet wheel. The pawl is pivoted on a stud 479 on lever 476. This same stud carries one end of a link 480, the other end of which is pivoted on the top of an operating lever 481 (Fig. 3).

This operating lever 481 is pivoted on a stud 482 on the side frame 461, and carries a follower roller 483 co-operating with a cam 484 on drive shaft 102. A spring 485 tends to rock the operating lever 481 in a clockwise direction, pressing the roller 483 against the surface of cam 484. The cam is formed so that the carbon feeding driving link 480 is reciprocated during the second half of the operating cycle. The rearward movement of link 480 draws the pawl 477 back to engage a tooth on ratchet wheel 475. Subsequent forward motion of link 480 results in the contact of the pawl against the tooth to drive the feeding shaft 474 (Fig. 29) in a clockwise direction.

The carbon feeding roller 473, co-operating with the driving roll 472 (Fig. 4) is movable to open a space between the rollers so that carbon feeding devices may be replenished with new carbons. The roll 473 forms part of a rod 486 pivoted on a pair of arms 487 and 488 (Fig. 7). The arms 487 and 488 are pivoted on studs 489 and 490 projecting from side frames 460 and 461 respectively. Coil springs 491, wound around the hubs of arms 487 and 488, urge the arms forward to bring the roller 473 against the roller 472. A pinion 492 on rod 486 (Fig. 27) meshes with a pinion 493 on the driving roller shaft 474. The upper ends of arms 487 and 488 are formed with flat faces co-operating with the inner edge of notches 494 and 495 (Fig. 27) cut in the side of a shaft 496. When shaft 496 is rocked, the periphery of the shaft cams the upper ends of the arms 487 and 488 towards the rear to open a space between the rollers 472 and 473. The operation of shaft 496 is explained more fully hereinafter with reference to the serial numbering device.

A knurled knob 529 is fastened to the end of shaft 474 so that the carbon feed rollers may be operated by hand. The machine is provided with a serial numbering device for printing consecutive numbers on the records as they pass over the autograph table. Such a serial number 5203 (Fig. 24) is shown printed at the top of the sample receipt 427. The number is also impressed on the other records through the carbons.

The numbering device is supported in a bail shaped frame 497 (Fig. 27) formed with three arms 498, 499, and 500 encircling shaft 496 with which the serial numbering unit may be rotated. The shaft 496 is cut square near arm 498 and a key plate 527 fastened to arm 498 fits over the cut and keys the bail 497 to the shaft.

On the ends of arms 498 and 499 (Fig. 27) are fixed inwardly facing pins 501 and 502. These pins act as pivot points for the pair of toggle arms 503 and 504, supporting a shaft 505 carrying four serial numbering wheels 506. The shaft 505 extends through a frame 507 (Fig. 28), carrying a rod 508, supporting a set of retaining pawls 509, co-operating with ratchet teeth 510, formed on sides of numbering wheels 506. This frame 507 is formed with two pairs of ears. In addition to the ears encircling the shaft 505, the frame is formed with ears 511 encircling a rod 512, carried at the upper end of a pair of arms 513, fixed to a shaft 514.

Attached to the end of shaft 514 (Fig. 29) is a release plate 515 for controlling the operation of the serial numbering device. A spring 516 fastened between a stud 517 on one of the arms 513 and a stud 518 on arm 499, tends to rock the linkage comprising arms 513, frame 507, and shaft 505 to bring the serial numbering wheels out over the autograph opening and down on the record material. This printing motion is only permitted at the proper time by the release of a latch 519 (Fig. 29) pivoted on a stud 520 on the side of arm 500. The latch is formed with a lug 521, cooperating with a shoulder 522 on the plate 515, attached to shaft 514.

The latch 519 is operated by an extension 523 extending from the top of the carbon feed operating arm 476. When the operating arm is rocked in a counterclockwise direction, the extension 523 strikes the rear end of lug 521 and pushes the latch 519 away from shoulder 522 on plates 515. This occurs at the mid-point of the cycle when the depression on cam 480 (Fig. 3) co-operate with the roller 483. Then spring 516 (Fig. 27) is free to rock the arms 513, pushing the frame 507 forward, and at the same time rocking toggle arms 503 downwardly to impress the serial numbering wheels 506 against the record material.

The plate 462 (Fig. 28) is cut with an aperture through which protrudes a flat platen 524 (Fig. 28) held in place by a backing plate 525 underneath the plate 462.

The serial numbering operating frame is restored by extension 523. On the return stroke of operating arm lever 476 (Fig. 29) the rear edge of extension 523 strikes a roller 526 on plate 515. The motion imparted to the plate by extension 523, through roller 526, is sufficient to move the shoulder 522 on the plate, above the tab 521 on the latch 519; thus the serial numbering device is restored immediately after the printing operation.

Referring to Fig. 27, it is noted that four serial numbering printing wheels 506 are loosely pivoted on the shaft 505 between the side portions of frame 507. All wheels 506 are formed with ratchet teeth 510, the teeth on the units wheels at the end being wider than the ratchet portion of the higher order wheels. A leaf spring 530, Fig. 28, attached to frame plate 507, presses down on pawls 509 to hold the pawls in engagement with the ratchet teeth 510 on the printing wheels, so that the wheels are held from turning until they are fed positively in a clockwise direction by a feeding pawl 531. This pawl is pivoted on a rod 532 extending across a bail 533 with arms 534 pivoted at 535, Figs. 27 and 29, at two sides, on the front ears of frame 507. A coil spring 536, Fig. 28 wound around rod 532 and caught on the pawl holds it down into co-operation with teeth 510.

The feed pawl 531 is operated in a rearward feeding direction by the restoring movement of toggle arms 503. Protruding inwardly from the sides of both arms 503 are pins 537, Fig. 29, engaging in notches cut in the sides of arms 534. When the serial numbering devices are restored, the arms 503 rock in a clockwise direction about shaft 505 and pins 537 cam arms 534 in a clockwise direction about pivots 535, carrying pawl 531, Fig. 28, along therewith to feed the units number wheel through a distance of one step. During the actuation of the serial numbering device, when the frame 507 moves forward and downward, bail 533 is retracted to raise pawl 531 behind the next tooth 510 in readiness for a feeding operation.

The pawl 531 is of the well known deep notch transfer type and is a common driver for all four wheels of the numbering unit. When the pawl has fed nine steps on the units wheel, it falls into a deep notch 538 therein to permit a shorter, normally inoperative point on the pawl, to engage the ratchet teeth 510 of the tens order wheel to turn the wheels to represent 10. The same mode of transfer is employed with the two higher orders which are turned by successively shorter points on pawl 531 when notches such as notch 538 are presented under the pawl.

Figure 38:
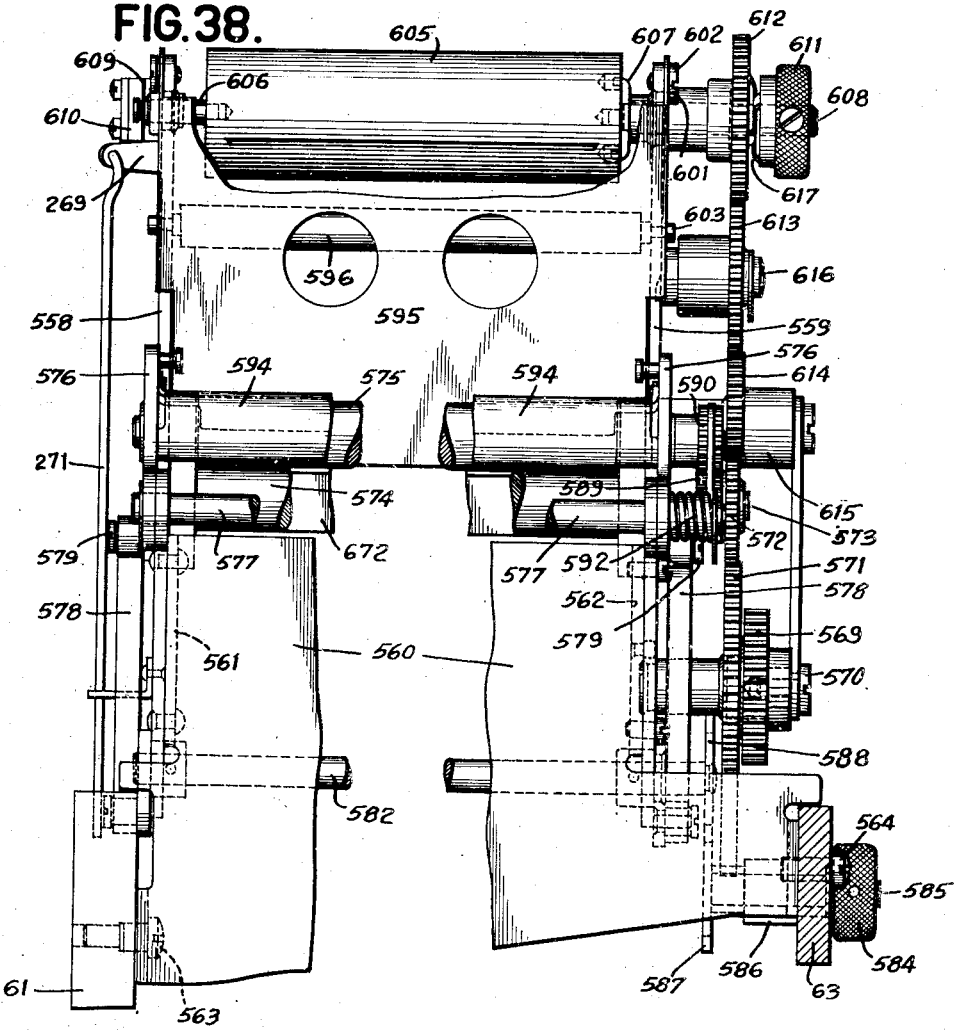
Figure 38 is a sectional elevation view of the record material feeding device.

The serial number printing wheels 506 are inked before each printing operation by a saturated inking pad 539, Fig. 38, which is moved down out of the path of the wheels when they move to print and change their setting, and then moved up to ink the raised numerals to be printed on the next operation. The pad 539 is fixed on a movable frame 540 with similarly shaped slotted sides sliding on rod 541 and 542 fixed between arms 498 and 499, Fig. 27. Pins 543 on the sides of rocking arms 513, cooperate with cam faces 544 on the sides of frame 540 to shove the pad 539 downward and forward as the wheels 506 move in the same general direction to print above platen 524. A spring 545 draws the pad frame 540 towards the rear so that cam faces 544 are in constant cooperation with pins 543.

Although the bail frame 497, Fig. 27, carrying the serial numbering device is fastened to shaft 496, the entire unit and the shaft may be rocked up around the bearings of shaft 496 in side frames 460, 461. This may be done to gain access to the carbon feeding rollers 472, 473. The keying connection between frame 497 and shaft 496 is made through the slotted key plate 527 on arm 498 engaging a squared section (not shown) on shaft 496. As explained hereinbefore, when shaft 496 is turned, it acts as a cam to shift arms 487, 488 and move roller 473 away from carbon feed roller 472. Thus, the operation of rendering the rollers accessible is synchronized with the opening of the rollers.

The serial numbering device frame 497 is normally held down by a latch 546, Fig. 29, cooperating with a lug 547 fastened to the arm 500 of the frame. The latch is pivoted on stud 548 on side frame 460 and held in operative position by a spring 549. A hook 550 is formed on the latch to act as a stop against the top of shaft 496. The end of the latch may be raised by hand when it is desired to raise the serial numbering device and separate the carbon feed rollers. As the frame 497 is rocked with shaft 496 as a center, a stud 551 on arm 500 abuts against a shoulder 552 on arm 487 which acts as a stop and resting surface. Extension 553 is a thumb piece on frame 497 to aid in lifting the frame.

The record feeding devices

After the three records pass over the autograph table, they are drawn together through feed rollers in a unit to the left of the serial numbering device frame. This unit holding the feed rollers also holds the punching devices, the indicators and the ejection rollers.

The main side frames 558 and 559, Figs. 2, 35, 38 and 31, of this unit are positioned parallel to rear frame 61, Fig. 2. At the right of the unit is fastened a plate 560, Fig. 38, connected at the insides of the unit frames by angles 561, 562 and secured to the rear frame 61 by screw 563 and attached to bar 63 by screw 564. The other side of the unit is held on the main frame by screws 564', Figs. 7 and 31, passing through the side frames into lugs on the bracket 164.

Figure 33:
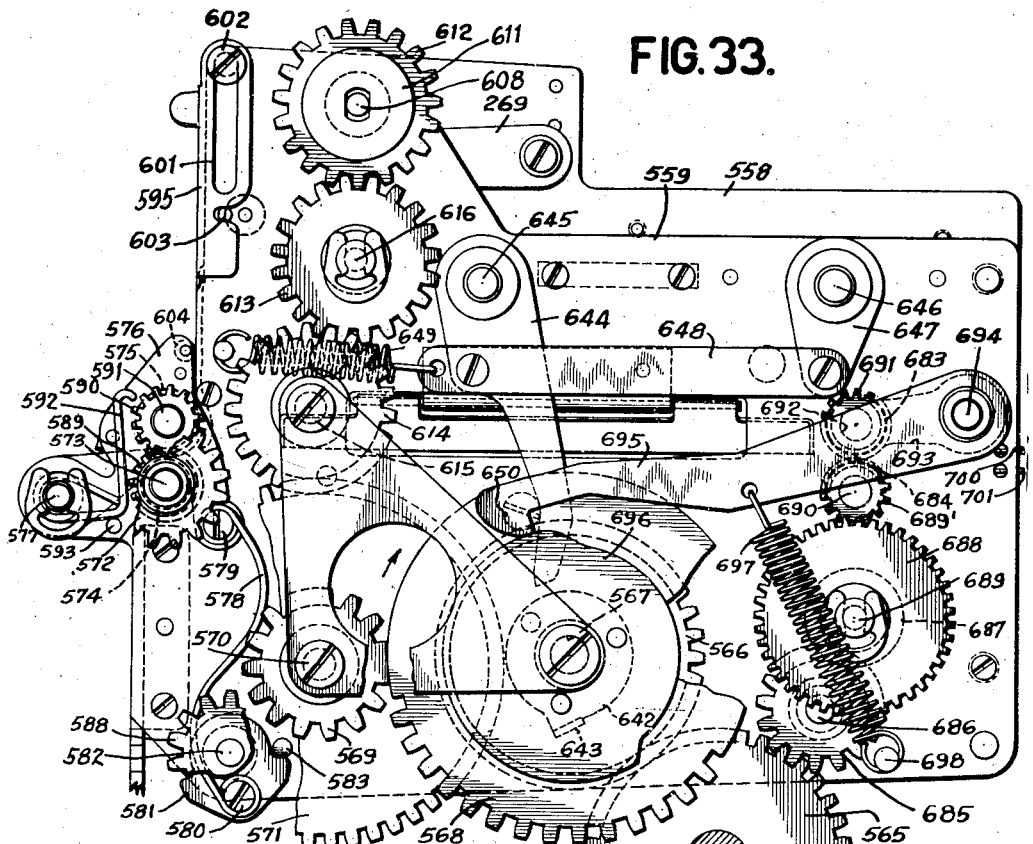
Figure 33 is a rear view showing the punch operating mechanism, the record feed rolls and the ejection rolls for the perforated card.

At the rear of the paper feed unit is carried a train of gearing best shown in Fig. 33. There it is noted that a gear 565 on the drive shaft 106 is in mesh with a gear 566 loosely pivoted on a stud 567 fixed in the rear frame 559. Attached to gear 566 is a mutilated gear 568 with teeth on approximately one-third of its periphery. In engagement with gear 568 is a Geneva pinion 569 rotating on a stud 570 on frame 559. Between pinion 569 and gear 568 is formed an intermittent drive with 569 being turned one revolution early in the cycle and then remaining idle while the perforated card is punched and ejected. The rotation of pinion 569 is timed to occur in synchronism with the movement of the electro roll 437, Fig. 7, described hereinbefore.

The driving connections to the paper feed rollers continue through a gear 571, Fig. 33, attached to pinion 569. This gear 571 meshes with a pinion 572 on the paper feed drive shaft 573. The drive shaft extends across the unit, Figs. 35 and 38, through bearings in frames 558, 559, and carries a feed roller 574.

Another feed roller 575 is mounted on arms 576 pivoted on rod 577. This top roller 575 is pressed down on the record material over roller 574 by a pair of leaf springs 578 encircling studs 579 on arms 576. The lower ends of the leaf springs 578 encircle studs 580 on plates 581 fastened to a shaft 582 pivoted in frames 558, 559. When the plates 581 are turned so that the studs 580 pass over a dead center line which may be drawn between the center of stud 579 and shaft 582, the leaf springs 578 urge arms 576 downwardly to force roller 575 against feed roller 574. A pin 583 in frame 559 acts as a stop for one of the plates 581.

A knob 584, Fig. 38, is provided for manual operation of shaft 582 to raise and lower the roller 575 so that the records may be started under the rollers and access given to the paper shearing knife. The knob 584 is fastened to a short shaft 585 running in a bearing 586 on bar 63. On the inner end of shaft 585 is a pinion 587 meshing with another pinion 588, Fig. 33, fastened to shaft 582. When the knob is turned in a counterclockwise direction, Fig. 7, the plates 581, Fig. 33, are turned clockwise to lift springs 578 and push arms 576 around shaft 577 to lift roller 575 out of contact with roller 574.

As the knob is turned in the reverse direction, the roller frame is thrown down and pressed down by the springs 578 as they are passed around the lower dead center by studs 580.

When the upper roller 575 (Fig. 33) is in feeding relation with driving roller 574, it is driven positively by a pinion 589 on shaft 573, meshing with a similar pinion 590, fastened to the shaft 591, carrying roller 575. This shaft 591 rotates freely in the pair of arms 576, but is held in position when arms 576 are lifted so as to insure the proper meshing relationship between pinions 590 and 589 when the arms 576 are again lowered. The detent means for holding pinion 590 in position when lifted, takes the form of a stiff spring 592 wound around the end of shaft 577. The one end of the spring catches against the lower surface of the rear arm 576. The other end of this spring projects up in a vertical direction with a hooked end that fits in between the gear teeth on upper pinion 590.

In the normal position of the parts, the end of spring 592 is out of the path of the teeth on the pinion. The spring is held in this inoperative position by a pin 593 on frame 559, contacting a horizontal portion of the spring. When the arms 576 are lifted, the pinion 590 moves towards the hooked end of the spring to be held in position thereby when the spring is lifted away from the pin 593.

After the three different forms of record material pass through the feeding rollers 574 and 575 (Fig. 34) they branch off in different directions. The receipt form 427 is curved around between a pair of guides 594, 595 and projected out of the machine.

The continuous record form 428 is curved around behind guide 595 and drawn up over a guide roller 596. The other record material forming perforated card 429 passes straight through the rollers in a horizontal direction, passing under knife 597 and punches 598.

The guide 594 (Figs. 34, 35, and 38) is fastened to the inside of arms 576 by rivets 599. It is formed with a serrated edge 600 against which the receipt form 427 may be torn.

The guide 595 (Fig. 34) is shaped so that it may be swung up to disclose the knife and punching mechanism when the feed roller 575 is lifted. The upper part of this guide is formed with a pair of slotted flaps 601 (Fig. 33) encircling screws 602 on side frames 558 and 559. A pin and slot connection 603 normally holds the guide from moving vertically.

A pair of studs 604 on arms 576 normally press against the outer surface of guide 595 to hold it from swinging horizontally. However, when arms 576 are lifted, the studs 604 move away from the guide 595 and it is free to disengage the pin and slot connection 603 so that the entire guide may be moved in a vertical direction until screws 602 hit the ends of slots 601. After guide 595 is shifted clear of the feed rolls, it may be swung about studs 602 to disclose the inside of the punch unit.

The continuous record material 428 (Fig. 34) after passing around the guide roller 596, pivoted between frames 558 and 559, passes around a storage roll core 605. This roll core is removably held between a plunger 606 (Fig. 38) in frame 558, and a key 607 fastened on a shaft 608, passing through frame 559. The core is held in place by a leaf spring 609 (Figs. 35 and 38) fastened at one end on a block 610, attached to frame 558, and pressing at the mid-point against a shoulder near the outer end of plunger 606. The slot in spring 609 engaging plunger 606 is formed with an enlarged end so that it may be easily assembled on the plunger.

Associated with the key member 607 (Fig. 38) are parts for operating the storage roll core 605 automatically and by hand. A knurled knob 611 is attached to the outer end of shaft 608 so that the shaft may be manipulated by hand to turn the storage core 605 and wind the strip 428 on the roll 288.

Adjacent knob 611 is an operating pinion 612 loosely pivoted on shaft 608. This pinion has connections to the intermittent drive through pinions 613 and 614. Pinion 614 (Fig. 33) is pivoted on a stud 615, mounted on frame 559, and meshes with the intermittent drive gear 571. The other pinion 613 turns on a stud 616 on the frame 559 and meshes with both pinions 612 and 614. Through the above noted train of gears, pinion 612 is rotated in a clockwise direction early in each operating cycle. When it does so, it draws the continuous record form 428 (Fig. 34) around to form a roll 268. The connection between the loosely mounted pinion 612 (Fig. 38) and the shaft 608 keyed to core 605, is made through a friction cup washer 617, pressed between the outer face of pinion 612 and the inner face of knob 611 fastened to shaft 608. As the pinion turns the shaft is urged along therewith by the washer.

Thus, the storage roll 605 is frictionally driven to make up for the difference in diameter of the roller as record material is wound thereon.

As noted hereinbefore (Fig. 34) when the roll 268 of strip material 428 attains its maximum allowable diameter, this is sensed by arm 269 with a projection 270 bearing against the side of the material on the roll. This arm 269 is pivoted on a screw 618 in frame 559. It has connections reaching into the interlock devices of the machine to prevent operation of the machine when the storage roll is full.

Access to this storage roll may be prevented by closing the lock 56 (Fig. 1) on the removable section of the case covering the record feeding devices and the storage roll.

*The card punching and shearing devices*

The machine is equipped with means for making a perforated record of each transaction. This perforated record is in the form of a card which is punched to represent the amount of the transaction, the nature of the transaction, the clerk and department handling the transaction, and the date on which the operation occurs. A sample of such a perforated record is shown in Fig. 26. It is noted that the serial number impressed on the other records is duplicated on the perforated record. The written autograph impressions on the other records also appear on the perforated record.

There are eleven columns of index point positions suited for punching in the record card 428: five columns for amounts, a column for department designation, another column for clerk designation, one column for transaction designation, and three columns for date punchings. Eight of these punch columns (all except the date columns) are controlled by the actuators set according to the adjustment of the keyboard. The connections from the actuators to the punch setting device may be noted by reference to Figure 4.

Each of the five lower order amount actuators 139 and the transaction, clerk, and department actuators are pivotally connected to a separate link 619 extending toward rear of the machine. The rear ends of these links are pivoted on the lower ends of individual converging levers 620 loosely mounted on a shaft 621 fixed between the main side frames. As shown in Fig. 18 the upper ends of these levers 620 converge towards the punch section of the machine. The upper ends of the levers are forked to engage studs 622 (Fig. 31) on individual punch setting slides 623. Each of the punch setting slides 623 has a separate guide bar 624 fixed in a slanted position (Fig. 2) in the machine. The front ends of the guide bars 624 (Fig. 23) are located in slots cut in a bracket 625 fastened to a bar 626, fixed between the main side frames. The front ends of the bars are perforated for the passage of a rod 627 which passes through all of the bars and the projections on bracket 625. The bracket is cut away at the front in line with rod 627 to permit removal of the rod and the bars without disturbing the bracket. The rear ends of bars 624 are fixed in position by a rod 628 (Fig. 31), passing through a bracket 629, fastened to frame 559.

Each punch slide 623 is guided on the related bar 624 by a pair of side plates 630, riveted to the sides of the slide at 631. The plates 630 pass on both sides of bar 624 and confine the end of lever 620. A roller 632 pivoted between plates 630, contacts with the upper surface of bar 624 to provide an easy riding surface along the bar.

A pin 633 passing through the plate 630, is in a position directly under the lower edge of bar 624 and thus prevents upward movement of the slide 623. The rear ends of the slides 623 are provided with another pair of guide plates 634 attached to the slide by rivets 635. These plates 634 extend down on both sides of the bars 624 and carry a stud 636, contacting the lower edge of bar 624 to prevent rocking motion at the rear end of slide 623.

The punch slides 623 are formed with slots 637 (Figs. 31 and 34) through which the card material passes before and after punching. These slots are long enough to permit free motion of the card material when the punch slides are in any of the actuating positions. The upper rear end of each punch slide 623 carries a punch plunger 598, located in alignment with a die 638, cut in a plate on the lower arm of the slide. The upper end of the punch plunger 598 is formed as a cylindrical T 639 fitting in one of a series of correspondingly shaped slots 640 (Fig. 34) in a common punch operating ram 641. The ram extends across the top of all the slides 623 and the slots 640 therein are long enough to guide and operate the plungers 598 in any of the 10 or 12 punch adjusted positions. After the punches are adjusted differentially through the connections to the actuators 139, the ram is moved downwardly to press all of the plungers 598 through the card 428 and the dies 638. The description of the train of connections for operating ram 641 may be studied by referring to Fig. 38.

Attached to the inner side of gear 566 (Fig. 38) is a plate 642 formed with a projection 643. Standing in the path of projection 643 is the end of an arm 644 attached to shaft 645 pivoted between frames 558 and 559. The arm 644 forms part of a parallel linkage including another shaft 646, an arm 647, and a link 648 connecting arms 644 and 647. A heavy spring 649 attached to link 648 tends to rock the shafts 645 and 646 in a clockwise direction until the end of arm 644 is stopped against a screw 650 on frame 559. The punch operating linkage remains in this position until a time near the mid-point of the operation, after the feeding of record material. Then the projection 643 strikes the lower end of arm 644 to rock the shafts 645 and 646 in a counter clockwise direction.

Figure 34:
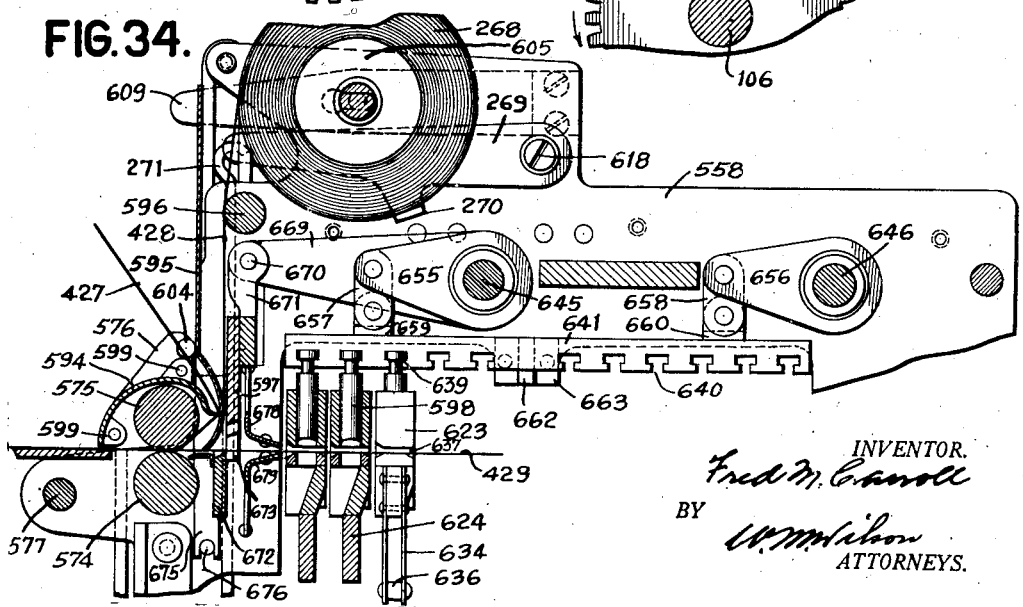
Figure 34 is a section taken through the punch showing the knife for severing the perforated card material.
Figure 35:
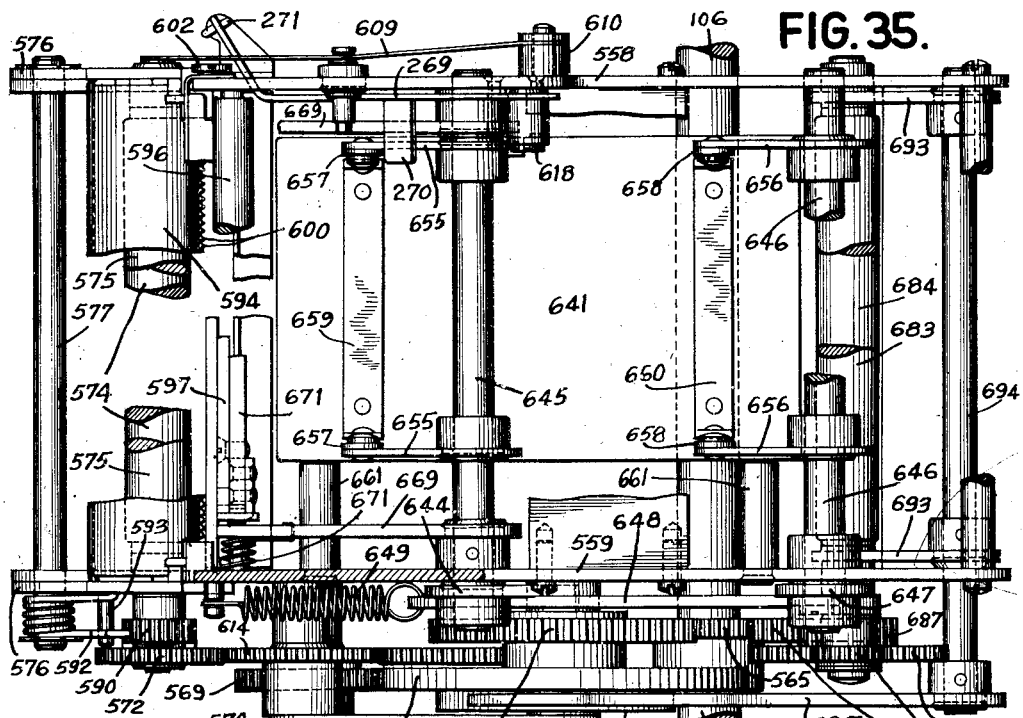
Figure 35 is a plan view of the punch operating mechanism and paper feed devices.

Referring to Fig. 34, it is seen that between the side frames 558 and 559, the shafts 645 and 646 carry arms 655 and 656 respectively. These arms are fixed to the shafts and pivotally connected to the upper ends of pairs of short links 657 and 658 articulated on brackets 659 and 660 fastened to the top of the punch operating ram 641. When the shafts are operated by movement of arm 644, the ram is lowered to operate the punches and perforate the card. After punching, the punches are suddenly withdrawn from the dies by escapement of the arm 644 (Fig. 33) past the projection 643 in a clockwise direction under the urging of spring 649. The rear end of the ram 640 (Fig. 31) is guided by a pair of studs 661 fastened to the frame 559. The front edge of the ram is guided by a projection 662 on a bracket 663 attached to frame 558.

The three date setting punch slides 623' (Fig. 32) at the left of the punch unit are of a slightly different form than the other punch setting slides. These punch selectors are adapted to be adjusted by hand through the opening in the case covered by shield 664 (Fig. 1). Each of these date punch slides 623' is provided with a finger piece 665 (Fig. 32) which may be engaged to draw the slide back and forth along a guide bar 624'. The three guide bars 624' are each formed with a series of 12 locating notches 666 for positioning the slide 623'. A spring pressed plunger 667 placed in a cavity formed by a notch in the rear of finger piece 665, cooperates with the notches 666 to hold the punch slide 623' in position. The plunger 667 and an associated spring 668 are confined by slide plates 630 and the front end of slide 623'. The left one of the date punch slides may be set to represent a month of the year. The other two date slides are set to represent the day of the month.

Figure 37:
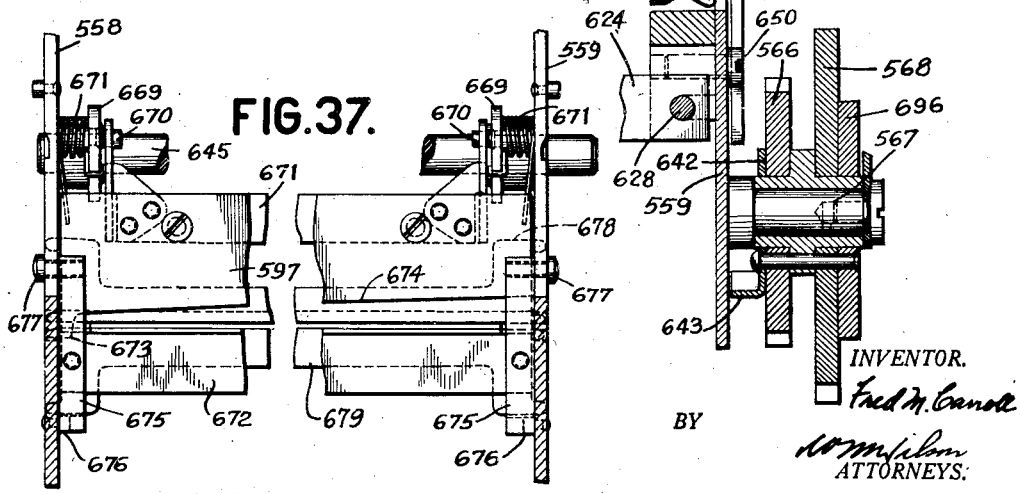
Figure 37 is a side view of the knife for severing the perforated card.

Returning to consideration of the punch operating devices, as shown in Fig. 34, it may be noted that the same devices are used to operate a knife to shear off record card 429 when it is punched. Attached to shaft 645 is a pair of arms 669 with inwardly facing pins 670, carrying a bracket 671, attached to knife blade 597. In Fig. 37 is seen that the pins 670 also project from the outer edges of arms 669 and carry coil springs 671, pressing against the side of bracket 671 to force the cutting edge of knife 597 against a similar edge on a lower cutting blade 672.

There is an extension 673 on blade 597 which contacts against the side of blade 672 to hold the blades normally in readiness for a cutting operation. The cutting edge 674 of the upper moving blade 597 is slanted for a shearing effect while the lower cutting edge is horizontal, to coincide with the position of the record material. The lower blade 672 is mounted on a pair of blocks 675 located by pin and slot connections 676 (Fig. 34) on the inside of frames 558 and 559 and removably connected thereto by screws 677 (Fig. 37).

After the punching and shearing operations, the end of the card stock must be guided into the punch section. This is taken care of by a pair of guides 678 and 679 (Fig. 34) located between the cutting knives and the first punch slide 623 on the right of the punch unit.

Figure 36:
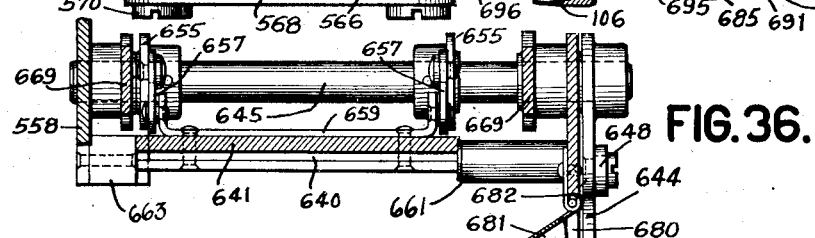
Figure 36 is a sectional view showing the guiding means for the punch operating ram.

Access may be had to the inside of the punch unit through an opening 680 (Fig. 36) formed in the rear frame 559. This opening is normally covered by a shield 681 pivoted on a bracket 682, attached to frame 559. The opening may be used to remove an imperfect card should the card material be crumpled or jammed in the punch unit.

After a record card 429 is punched and sheared, it is ejected from the left side of the machine by a pair of ejection rolls 683 and 684 shown in Fig. 33. Lower roll 684 is driven continuously throughout an operating cycle, but the upper roll 683 is lifted out of co-operation therewith until after the punching operation is finished. The driving connections for the rolls include gearing connected to the gear 565 on drive shaft 106. Meshing with gear 565 is a pinion 685 pivoted on a stud 686 on frame 559. This pinion drives another pinion 687, attached to a gear 688, loosely pivoted on a stud 689 on frame 559. The gear 688 meshes with a pinion 689' fastened to the shaft 690 carrying the ejection roll 684. Shaft 690 extends across the unit and turns in bearings fixed on frames 558 and 559.

Meshing with pinion 689' is a pinion 691, attached to shaft 692, carrying the ejection roll 683. This shaft 692 extends through a large hole in side frame 559 and it is carried on the ends of a pair of arms 693 (Fig. 35), fastened to a shaft 694. This shaft is borne by hubs in frames 558 and 559 and it projects beyond the rear edge of frame 559. On the rear end of shaft 694 there is fastened a cam follower arm 695, co-operating with a cam 696, fastened to the gear 568. A spring 697, drawn between lower arm 695 and a stud 698 on frame 559, holds the arm in constant co-operation with the periphery of the cam 696. The cam is formed with a concentric portion co-operating with the follower arm to cause a dwell during the first half of the operating cycle. However, after the punching and shearing operations are concluded, then a time in the operation is reached when the cam presents a depressed formation under the follower arm 695; then the arm may rock in a counterclockwise direction (Fig. 33) under the tension of spring 697 to lower the connected roll 683 to pinch the perforated card 429 between the ejection rolls. Then the rolls are effective to eject the card towards the right, throwing it out of the left side of the machine. Although the pinions 689 and 691 remain in mesh during the entire operating cycle, they are separated sufficiently throughout the first part of the cycle so that they are ineffective to disturb the card material before and during the punching operation. A pair of guides 700 and 701 direct the card 429 as it leaves the ejection rolls.

A hopper 702 (Fig. 7) is attached to frame 559 under the punch unit to gather the punchings dropped from the dies. The lower end of the hopper is directed into a chute 703 for carrying the punchings to a box 704 standing on the base 58.

*The indicating mechanism*

The machine is provided with means for indicating the amounts set up on the four lower orders of the amount keys on the keyboard. Two sets of indicating drums are provided to disclose the amount settings at the front and rear of the machine. After the indicators are adjusted while recording the transaction, they remain in position until another sale is recorded.

The entire indicating mechanism is held in a unit which may be removed from the machine. The main frame of the indicator unit (Fig. 39) is composed of three plates 705, 706, and 707 held together by rectangular brackets 708 and 709. Bracket 709 is attached to frame 558 of the punch unit. Another bracket 710 fixed between plates 705 and 706, carries a securing member 711 which is attached to the rear frame 559 of the punch unit. A shield 712 is carried by another bracket 713 between plates 705 and 706. This shield covers the tops of both sets of indicating drums 714 and 715.

The drums are adjusted by connections from the actuators 139 controlled by the four lower order amount key banks. Reference to Figs. 4 and 18 discloses that the four lower order converging levers 620 are formed with forwardly projecting arms 716, carrying studs 717 fitting in slots 718, cut in a set of four indicator operating links 719. These links 719 (Fig. 40) are removably connected to pins 720 on the ends of arms projecting from a set of sectors 721, pivoted on a shaft 722, running through the entire indicator unit.

The arms of the sectors 721 are provided with spring clips 723 for holding the links 719 on the pins 720. However, the clips may be forced on the side to disconnect the links. The sectors 721 are formed with rack teeth meshing with separate pinions 723, 724, 725, and 726 fixed on shafts 727, 728, 729, and 730 respectively. The pinions are held on the shafts by set screws so that they may be adjusted to influence the position of the numbers exhibited on the indicating drums. Each of the four shafts carries another pair of pinions for operating sectors connected to the pair of related front and rear indicating drums. The shaft 727 carries pinions 723' and 723" to adjust the front and rear units order indicating drums 714 and 715.

The other lower order shafts 728, 729 and 730 are provided with similar pairs of pinions 724', 724", 725', 725", 726' and 726" for connection to the other front and rear indicator drums. The pairs of pinions are held on the shafts by set screws so that an individual adjustment may be made for the setting of each drum. A stiffening bracket 732 is attached to the bar 108 and formed with four slots in which the shafts 727, 728, 729 and 730 are located for support without interfering with their removal when the end screws 733 on which they pivot are withdrawn. At the other end the shafts turn on pointed studs 736 fixed on side frame 705. A rod 731 fastened between the frame plates 705 and 707, spaces them and stiffens the entire structure.

All eight of the pairs of pinions on the indicator operating shafts have connections to related pairs of drums through eight separate sectors 737 in mesh with the pinions. These sectors 737 are loosely pivoted on shaft 722 and rock in mesh with segmental levers 738, 739 loosely pivoted on a shaft 740 fixed between the two frames 705 and 706. The four levers 738 engage pinions 741 associated with the front drums 714, and levers 739 are in mesh with pinions 742 connected to the rear drums 715. A spider 743 is attached to the inside of each drum to carry the hub of the drum and provide a means for fastening the driving pinion to the drum. The front indicator drums 714 are loosely pivoted on a shaft 744 and rear drums 715 are mounted in a similar fashion on another shaft 745. Both shafts are fixed between frames 705 and 706 of the indicator unit.

Both sets of indicator drums turn in a counterclockwise direction, Fig. 40, to disclose the numerals on the drums through sight openings in the case. The numerals on the front drums 714 may be observed through the glass window 746, and the numbers on the rear drums may be seen through the other window 747 in the case.

Springs 748 attached to levers 738 and 739 act to hold the levers and connected drums in adjusted position and tend to restore them to the normal zero position.

The operation of setting a related pair of indicator drums may be explained with reference to one order, the units order for example. The units order link 719, Fig. 4, is pulled down a differential distance by the stud 717 on lever 620. The extent of this motion is limited by the units actuator 139 connected to lever 620 and stopped by cooperation with the end of a depressed amount key in the units bank. The upper end of this lowered link 719 is connected to a sector 721 which meshes with the driving pinion 726 on the units order indicator operating shaft 730. This shaft carries two other pinions 726' and 726" for transmitting the motion of the units actuator to the two units indicator drums 714 and 715. Pinion 726' meshes with upper sector 737, Fig. 39, engaging segmental lever 739 meshing with pinion 745 on the rear units drum 715. At the same time and with the same motion, pinion 726" turns sector 737 to rock lever 738 meshing with pinion 741 attached to the front units drum 714. It is noted that the two related units order drums are at opposite ends of the indicating unit. This is so because they must appear at the right from both sides of the machine. The three other pairs of denominational order indicators are operated in a similar way to show the amounts set up on the keyboard.

Although the indicators are shown in the zero position in Figs. 39 and 40, it is understood that after each item entering operation the indicator drums will remain at the setting showing the amount last entered into the machine. The devices for holding the indicators in adjusted position include a series of four holding pawls 749 adapted to cooperate with ratchet teeth 750 formed on the bottom of the sectors 721. The pawls 749, Fig. 23, are mounted on a shaft 751 that is pivoted between a frame plate 753 and a bracket 752 fastened between the inside of bar 709 and the side of plate 753. The operation of the pawls 749 is controlled by a bail 754 pivoted on shaft 751 and formed with an operating arm 755. Springs 756 drawn between the pawls and a flange on bracket 752, tend to hold the pawls up against the underside of bail 754. The bail is rocked in a counterclockwise direction, Fig. 40, to engage the pawls 749 with teeth 750 shortly after the actuators 139, Fig. 2, have reached the differential adjusted positions, and before they move back towards the home positions.

A cam 757, Fig. 6, attached to shaft 102, is proportioned to operate bail 754 at the proper time. Cooperating with this cam is a bell crank 758 pivoted on a stud 759 and formed with a horizontal arm pivotally connected to the lower end of a link 760 the upper end of which is connected to the operating arm 755 of bail 754. The springs 756, Fig. 40, bearing against bail 754, tend to hold the crank 758 in cooperation with cam 757.

Early in the operating cycle, shortly after the actuators start to move, the cam 757 operates bail 745 in a clockwise direction to rock pawls 749 out of engagement with teeth 750. Then springs 748 are released to draw the indicator gearing and the connected indicator drums 714 and 715 back towards zero position. The links 719 rise at the sime time that the indicator operating studs 717, Fig. 4, are depressed by the motion of the actuators. The ends of the slots 718 in the links meet the studs 717 midway and then the links are positioned to conform to the new setting of the actuators. After the actuators stop, the cam 757 releases the bail 754 so that the pawls 749 may become effective to lock the indicator drums in the positions disclosing the new setting.

While there is shown, described and pointed out the fundamental novel features of the invention as applied to a single modification, it will be understood that various omissions, substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a machine for producing a plurality of records, a serial numbering device for printing on said records, a shaft carrying said device, a plurality of carbon sheets between said records, a pair of rollers for feeding said carbon sheets, means for operating said rollers, means under control of said roller operating means for moving said device against said records to print thereon, and means operated by said shaft for separating said rollers when said numbering device is moved away from the records.

2. In a machine for producing a plurality of records, means for printing on said records, a pair or rollers for feeding said records, a pair of arms for carrying one of said rollers, a pair of flat springs, one spring pivoted on each of said arms, a pair of rocking plates to which the other ends of said springs are attached, and means for turning said plates in one direction to lift the springs and arms to separate the feed rollers and in the other direction to draw the ends of the springs around a dead center, tensioning the springs and holding the rollers in cooperation for feeding.

3. In a machine for producing a record strip and record cards, means for recording and duplicating data on the strip and cards, means for feeding the strip and card after each operation of said recording means, means for sensing the presence of a card, means for sensing the amount of record strip wound on a roll, and, means under control of both sensing means for stopping operation of said recording and feeding means when the supply of cards is exhausted or when the strip roll is full 4. In a machine for producing sets of records with a plurality of records in each set, carbon sheets between the records of a set, a pair of rollers for feeding said sheets, means for operating said rollers, a serial numbering device for distinctively numbering the sets of records, means for feeding a set of records past said device on each cycle of operation of the machine, and means under control of said carbon roller operating means for impressing said device against a set of records and the carbon sheets on each cycle of operation of the machine.

FRED M. CARROLL.

CERTIFICATE OF CORRECTION.

Patent No. 2,174,686.  October 3, 1939.

FRED M. CARROLL.

It is hereby certified that error appears in the printed specification of the above numbered patent requiring correction as follows: Page 4, first column, line 37, for "supoprt" read support; page 8, second column, line 19, and line 63-64, and page 9, first column, line 68, for "substracting" read subtracting; page 10, second column, line 74, for "Propecting" read Projecting; page 11, second column, line 40, for "lever 523" read lever 423; page 13, first column, line 48, for the word "in" read is; page 15, first column, line 61, for "junch" read punch; page 18, second column, line 11, claim 3, for "and, means" read and common means; and that the said Letters Patent should be read with this correction therein that the same may conform to the record of the case in the Patent Office.

Signed and sealed this 13th day of February, A. D. 1940.

(Seal)

Henry Van Arsdale,
Acting Commissioner of Patents.